United States Patent
Kothinti Naresh et al.

(10) Patent No.: US 11,061,824 B2
(45) Date of Patent: Jul. 13, 2021

(54) DEFERRING CACHE STATE UPDATES IN A NON-SPECULATIVE CACHE MEMORY IN A PROCESSOR-BASED SYSTEM IN RESPONSE TO A SPECULATIVE DATA REQUEST UNTIL THE SPECULATIVE DATA REQUEST BECOMES NON-SPECULATIVE

(71) Applicant: Microsoft Technology Licensing, LLC, Redmond, WA (US)

(72) Inventors: Vignyan Reddy Kothinti Naresh, Morrisville, NC (US); Arthur Perais, Morrisville, NC (US); Rami Mohammad Al Sheikh, Morrisville, NC (US); Shivam Priyadarshi, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/558,843

(22) Filed: Sep. 3, 2019

(65) Prior Publication Data
US 2021/0064541 A1    Mar. 4, 2021

(51) Int. Cl.
*G06F 12/12* (2016.01)
*G06F 12/084* (2016.01)
(Continued)

(52) U.S. Cl.
CPC .......... *G06F 12/12* (2013.01); *G06F 9/30043* (2013.01); *G06F 9/544* (2013.01); *G06F 12/084* (2013.01); *G06F 12/0837* (2013.01)

(58) Field of Classification Search
CPC .... G06F 12/0837; G06F 12/084; G06F 12/12; G06F 9/30043; G06F 9/544
See application file for complete search history.

(56) References Cited

U.S. PATENT DOCUMENTS 6,321,328 B1    11/2001    Karp et al.
8,943,273 B1    1/2015    Jamil et al.
(Continued)

OTHER PUBLICATIONS

Yan, Mengjia, et al., "InvisiSpec: Making Speculative Execution Invisible in the Cache Hierarchy," International Symposium on Microarchitecture, 2018, IEEE, pp. 428-441.
(Continued)

*Primary Examiner* — Aracelis Ruiz
(74) *Attorney, Agent, or Firm* — Withrow & Terranova, PLLC

(57) ABSTRACT

Deferring cache state updates in a non-speculative cache memory in a processor-based system in response to a speculative data request until the speculative data request becomes non-speculative is disclosed. The updating of at least one cache state in the cache memory resulting from a data request is deferred until the data request becomes non-speculative. Thus, a cache state in the cache memory is not updated for requests resulting from mispredictions. Deferring the updating of a cache state in the cache memory can include deferring the storing of received speculative requested data in the main data array of the cache memory as a result of a cache miss until the data request becomes non-speculative. The received speculative requested data can first be stored in a speculative buffer memory associated with a cache memory, and then stored in the main data array if the data request becomes non-speculative.

35 Claims, 11 Drawing Sheets

(51) Int. Cl.
*G06F 9/30* (2018.01)
*G06F 9/54* (2006.01)
*G06F 12/0837* (2016.01)

(56) References Cited

U.S. PATENT DOCUMENTS

| | | | | |
|---|---|---|---|---|
| 2002/0199063 A1* | 12/2002 | Chaudhry | ........... | G06F 12/0811 |
| | | | | 711/122 |
| 2002/0199066 A1* | 12/2002 | Chaudhry | ........... | G06F 12/0811 |
| | | | | 711/141 |
| 2011/0047334 A1* | 2/2011 | Eichenberger | ...... | G06F 12/0842 |
| | | | | 711/141 |
| 2014/0189253 A1* | 7/2014 | Mohandru | .......... | G06F 12/0815 |
| | | | | 711/146 |
| 2017/0177365 A1* | 6/2017 | Doshi | ................. | G06F 12/0891 |

OTHER PUBLICATIONS

Li, et al., "Conditional Speculation: An Effective Approach to Safeguard Out-of-Order Execution Against Spectre Attacks", In Proceeding of IEEE International Symposium on High Performance Computer Architecture (HPCA), Feb. 16, 2019, pp. 264-276.
"International Search Report and Written Opinion Issued in PCT Application No. PCT/US2020/037990", dated Oct. 1, 2020, 14 pages.

* cited by examiner

DEFERRING CACHE STATE UPDATES IN A NON-SPECULATIVE CACHE MEMORY IN A PROCESSOR-BASED SYSTEM IN RESPONSE TO A SPECULATIVE DATA REQUEST UNTIL THE SPECULATIVE DATA REQUEST BECOMES NON-SPECULATIVE

FIELD OF THE DISCLOSURE

The technology of the disclosure relates to processor-based systems employing a central processing unit (CPU), also known as a "processor," and more particularly to a cache memory in the processor-based system used to store or "cache" copies of information in main memory for faster access by a processor.

BACKGROUND

A central processing unit (CPU), also known as a "processor," performs computational tasks for a wide variety of applications. A conventional processor includes one or more processor cores, also known as "CPU cores." A processor executes computer program instructions ("instructions"), also known as "software instructions," that are fetched from an instruction memory. The processor executes the fetched instructions from memory to perform operations based on an instruction type and data operands and generates a result. The result can be provided as an input to be consumed by another instruction and/or stored in a data memory as data. Instruction and data memory can be provided in a main memory as part of a processor-based system that includes the processor. Instruction and data memory can also be provided in the form of cache memory. For example, a data cache memory includes or "caches" smaller copies of data stored in main memory to provide the processor faster access to data. A cache memory system includes one or more cache memories organized in a hierarchy between the processor and main memory. Data migrates between main memory and the different levels of cache memory based on cache hits and misses. If the processor requests data not stored in any of the levels of cache memories (i.e., a cache miss), the data is retrieved from main memory and is stored in the levels of cache memories. If a subsequent request for the same data is made resulting in a cache hit (i.e., data is requested before the data is evicted out of the levels of cache memory), the data is provided from the cache memory to the processor as opposed to having to re-fetch the data from main memory.

Data retrieved from a higher level cache memory or main memory as a result of a cache miss in a lower level cache memory is temporarily stored in a dedicated structure known as a fill buffer in the lower level cache memory. The fill buffer is also known as a miss status holding register (MSHR). The fill buffer of a cache memory acts as a staging area for incoming data to be stored in the cache memory until cache entry in the cache memory becomes available to store the incoming data. The cache memory will evict an existing cache entry in a data array of the cache memory based on an eviction policy, such as least recently used, to make room for new incoming data as a result of a cache miss. A cache miss to a lower level cache memory can result in a data request (i.e., read request) to a next higher level cache memory that has the requested data stored in its data array or still stored in the fill buffer before being stored in a cache data array. Either way, requested data contained in either the fill buffer or the data array of a higher level cache memory can be provided to a lower level cache memory in response to a request for the data from the lower level cache memory. A cache memory can retain incoming data in its fill buffer and not store the data in its data array until the fill buffer becomes full, because incoming requests for the data can be fulfilled from the fill buffer as well as the data array.

A processor can employ instruction pipelining as a processing technique whereby the throughput of computer instructions being executed may be increased by splitting the processing of each instruction into a series of steps. These steps are executed in an execution pipeline composed of multiple stages. However, structural hazards can occur in an instruction pipeline where the next instruction cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional branch instruction may redirect the flow path of instruction execution based on a condition evaluated when the condition of the control branch instruction is executed. One approach for maximizing processor performance involves utilizing a prediction circuit to speculatively predict the result of a condition of a conditional branch instruction before its execution. In this manner, younger instructions that follow the predicted flow path of the conditional branch instruction can be fetched and also processed in the instruction pipeline instead of stalling until the branch condition is resolved when the conditional branch instruction is executed. When the conditional branch instruction finally reaches the execution stage of the instruction pipeline and is executed, the resultant target address of the conditional branch instruction is verified by comparing it with the previously predicted target address when the conditional branch instruction was fetched. If the predicted and actual target addresses match, meaning a correct prediction was made, delay is not incurred in instruction execution, because the subsequent instructions at the target address will have been correctly fetched and already be present in the instruction pipeline when the conditional branch instruction reaches an execution stage of the instruction pipeline. However, if the predicted and actual target addresses do not match, a mispredicted branch hazard occurs in the instruction pipeline that causes a precise interrupt. As a result, a misprediction recovery process is performed, whereby younger instructions than the conditional branch instruction in the instruction pipeline are flushed and the instruction pipeline fetch unit is redirected to fetch new instructions starting from the target address, resulting in delay and reduced performance.

Even though a misprediction recovery involves flushing younger instructions than the conditional branch instruction in the incorrectly predicted flow path and then fetching and processing instructions the instructions in the correct flow path, the processing of the younger instructions in the incorrect flow path can still cause data to be brought into cache memory as a result of cache misses. This can cause a security issue in the form of leaks. For example, a malicious attacker process executing in the processor can include code that loads a large amount of data from memory thus causing this data to fill a shared cache memory to prime the cache memory. The attacker process can also prime a branch prediction circuit to force an incorrect speculative prediction of a conditional branch instruction in a later executed victim process to later be made. Load instructions in the incorrect speculated flow path following the conditional branch instruction in the victim process causes the processor to load data into the cache memory even though these load instructions will be later flushed when the conditional branch instruction is executed and its condition resolved. This causes some of the data in the cache memory primed by the attacker process to be evicted from the cache memory by the load instructions in the incorrect flow path in the victim process. When the attacker process is executed again after the victim process is switched out, the attacker process can determine which of its primed data got evicted out of the cache memory. This information can provide information about the data addresses accessed by the victim process.

The aforementioned security issue can be addressed by providing a non-shared speculation buffer(s) outside of the shared cache memory to store loaded data from processing of speculatively processed load instructions. The speculatively loaded data into a speculation buffer from processing a speculatively processed load instruction can still be provided to consumer instructions dependent on the speculatively processed load instruction. When the load instruction that caused data to be speculatively loaded into a speculation buffer is executed and becomes non-speculative, if the speculative prediction was correct, the speculative request can be reissued non-speculatively. If the speculative prediction was not correct, the speculative request for the data is not reissued, thus preventing the speculatively loaded data from being installed in cache memory. In this manner, data is not loaded into the cache memory as a result of processing incorrectly speculated load instructions. However, up to twice as many (2×) data requests will be issued to load data into the processor, which is inefficient.

SUMMARY

Aspects disclosed herein include deferring cache state updates in a non-speculative cache memory in a processor-based system in response to a speculative data request until the speculative data request becomes non-speculative. The processor-based system includes a processor that may include one or more processor cores that execute computer software instructions to perform operations based on loaded data stored in main memory. The processor-based system also includes a cache memory system that includes one or more private and/or shared cache memories organized in a hierarchy between the processor and main memory. Each cache memory has a cache replacement policy that governs which data in its cache entries will be evicted to a higher level cache memory or main memory to make room to store new data requests (i.e., load/read requests). Load-based instructions ("load instructions") that are speculatively processed by the processor as a result of speculatively predicting a condition of a conditional flow control instruction (e.g., a conditional branch instruction) cause data requests to be made to the cache memory system. However, if the condition of the conditional flow control instruction is determined to have been mispredicted in execution, the speculatively processed load-based instructions may be flushed. However, the previous data requests to the cache memory system resulting from processing of the speculative load-based instructions that are no longer valid were made to the cache memory system. If such data requests were allowed to cause other cache data in the cache memory system to be evicted, this can cause cache pollution. This can also cause security issues. For example, a malicious attacker process may learn information about data accessed by victim process based on incorrectly speculative data loaded into the cache memory system. A malicious attacker process could prime the cache memory system with its own data and prime a control prediction circuit to make mispredictions for conditional flow control instructions in the victim process causing incorrectly speculative data to be loaded into the cache memory system. The attacker application could learn information about the victim process based on which of the primed victim data in the cache memory system was replaced by the incorrectly speculative data to be loaded into the cache memory system.

In this regard, in exemplary aspects disclosed herein, at least one cache state in a cache memory is deferred from being updated in a cache memory in response to a received data request until the data request becomes non-speculative. This is so the cache memory is not updated based on a data request resulting from a misprediction that should not have been issued had the misprediction occurred, and thus the cache memory is a non-speculative cache memory. In this manner, cache pollution may be reduced. As another example, an attacker process cannot obtain information about data accesses by a victim process executing in the processor by priming mispredictions in a control prediction circuit that causes data requests to be issued by the victim process resulting in speculatively changed cache states in the cache memory. If data requests that are not resolved as being non-speculative can change a cache state in the cache memory, an attacker application can gain understanding about data accesses by a victim process by understanding the changed cache states in the cache memory.

In one exemplary aspect, the deferring of a cache state update in the cache memory is provided by not initially storing received speculative requested data in a cache entry in the main data array of the cache memory received from a higher level memory as a result of a cache miss to the cache memory. Instead, the received speculative requested data is first stored in a speculative buffer memory that is not in the main data array of the cache memory. For example, the speculative buffer memory may be a fill buffer circuit in the cache memory that acts as a staging area for requested data to be stored until a cache entry in the main data array of the cache memory becomes available to store the incoming data. Speculative requested data stored in the speculative buffer memory is stored into an available cache entry in the main data array of the cache memory if the load instruction that resulted in the data request being requested becomes non-speculative. A new data request does not have to be issued by the processor to the cache memory system to cause the speculative requested data stored in the speculative buffer memory to be stored into a cache entry in the cache memory in response to the data request becoming non-speculative.

In another exemplary aspect, when data request issued from the processor to a cache memory in the cache memory system is contained in a cache entry in a main data array of the cache memory, a cache hit results. Because the speculative requested data is already contained in a cache entry of the main data array in the cache memory, the speculative requested data in the hit cache entry in the main data array in the cache memory is returned to the requestor in the processor. However, the updating of replacement cache state of the cache entry in the main data array containing the speculative requested data can be deferred until the load instruction that initiated the data request for data becomes non-speculative. This is so, for example, the replacement policy for the main data array of cache memory will not be performed based on a replacement cache state that was altered for the cache entry of the main data array containing the speculative requested data as a result of the data request, in case the data request is flushed as a result of a misprediction.

In another exemplary aspect, if a data request issued from the processor to a cache memory is not contained in the main data array, but is contained in the speculative buffer memory associated with the cache memory, the speculative requested data in the speculative buffer memory is also returned to the requestor in the processor as a cache hit. The updating of the cache state for speculative requested data is deferred by not writing the speculative requested data into a cache entry in the main data array of the cache memory until the data request becomes non-speculative. Also, as an example, the updating of the replacement cache state for the speculative requested data is automatically deferred until a new data request for the same data results in a cache hit in the main data array of the cache memory as discussed above.

In this regard, in one exemplary aspect, a non-speculative cache memory in a processor-based system is provided. The non-speculative cache memory comprises a main data array comprising a plurality of cache entries each configured to store cache data of data associated with a memory address in a memory system of the processor-based system. The non-speculative cache memory also comprises a speculative buffer memory comprising a plurality of buffer entries each comprising a data entry configured to store cached data associated with a memory address in the memory system. The non-speculative cache memory also comprises a cache controller configured to receive a data request from a requestor comprising a target address and an instruction identification (ID) identifying a load instruction comprising the target address processed by a processor in the processor-based system. The cache controller is also configured to search for a cache entry in the main data array associated with the target address of the data request. The cache controller is also configured to search the speculative buffer memory for a buffer entry associated with the target address of the data request. The cache controller is also configured to send a data response to the data request to the requestor based on cache data in the main data array being associated with the target address and a cache data in a buffer entry in the speculative buffer memory being associated with the target address. The cache controller is also configured to receive a commit indicator comprising an instruction ID of an instruction that is non-speculative. The cache controller is also configured to in response to the received instruction ID in the commit indicator indicating the load instruction of the data request is non-speculative update a cache state of a cache entry in the main data array associated with the target address of the data request.

In another exemplary aspect, a method of updating a cache state in a non-speculative cache memory in a processor-based system is provided. The method comprises receiving a data request from a requestor comprising a target address and an instruction ID identifying a load instruction comprising the target address processed by a processor in the processor-based system. The method also comprises searching a main data array for a cache entry associated with the target address of the data request among a plurality of cache entries each configured to store cache data associated with a memory address in a memory system of the processor-based system. The method also comprises searching a speculative buffer memory for a buffer entry associated with the target address of the data request among a plurality of buffer entries each configured to store cache data associated with a memory address in the memory system. The method also comprises sending a data response to the data request to the requestor based on a cache entry in the main data array being associated with the target address and a cache data in a buffer entry in the speculative buffer memory being associated with the target address. The method also comprises receiving a commit indicator comprising an instruction ID of an instruction that is non-speculative. The method also comprises updating a cache state of a cache entry in the main data array associated with the target address of the data request, in response to the received instruction ID in the commit indicator indicating the load instruction of the data request is non-speculative.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary processor-based system that includes a processor configured to issue memory requests (i.e., data read and data write requests) to a memory system that includes a cache memory system and a main memory, wherein at least one cache memory in the cache memory system is configured to defer updating a cache state in response receiving a data request from the processor until the data request becomes non-speculative;

FIG. 2 is a diagram of an exemplary instruction processing circuit that can be included in the processor in FIG. 1 and that includes one or more instruction pipelines for processing computer instructions for execution, wherein the instruction processing circuit includes a control flow prediction circuit configured to speculatively predict conditions of conditional flow control instructions fetched and processed by an instruction processing circuit;

Figure 1:
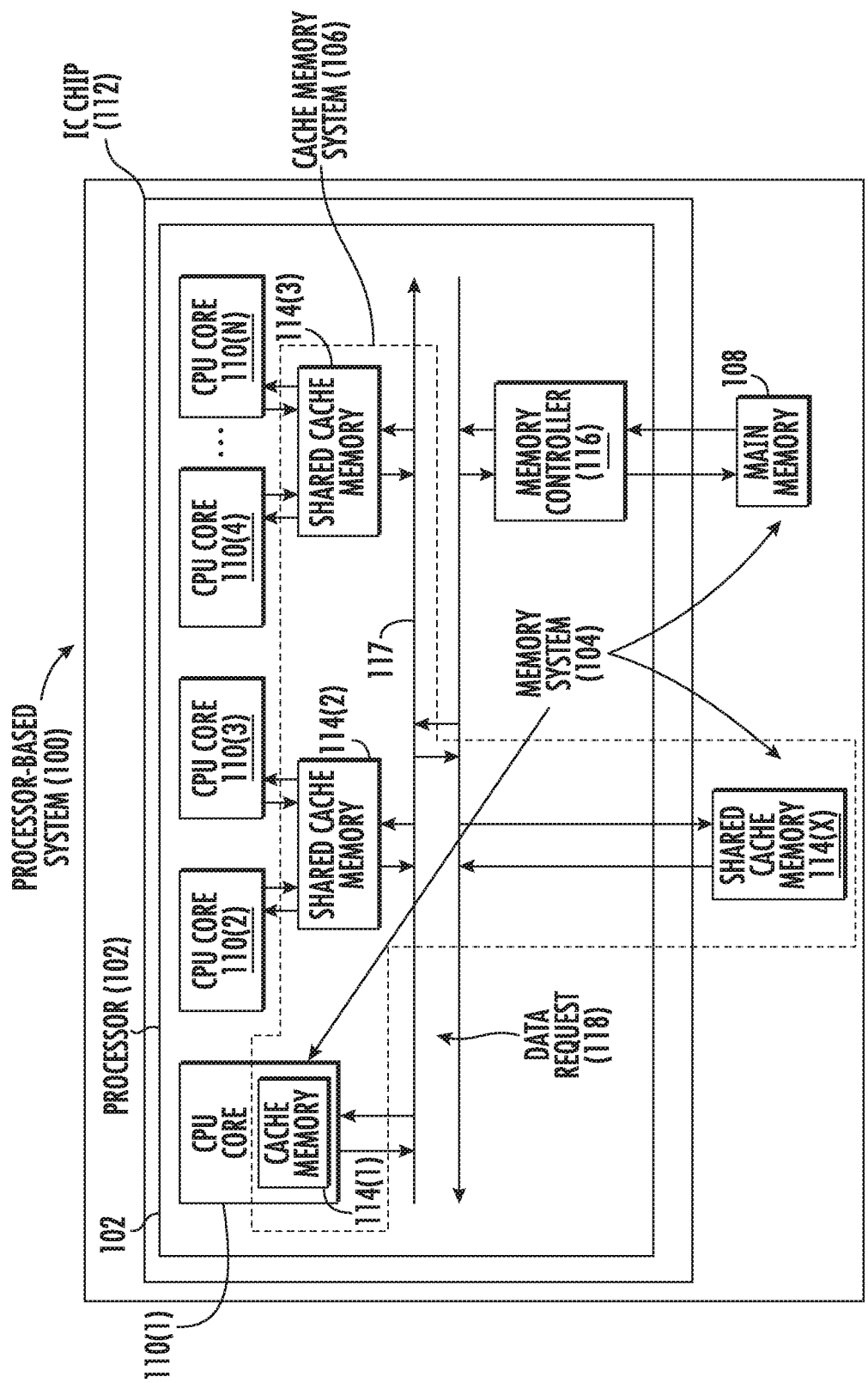
Figure 3:
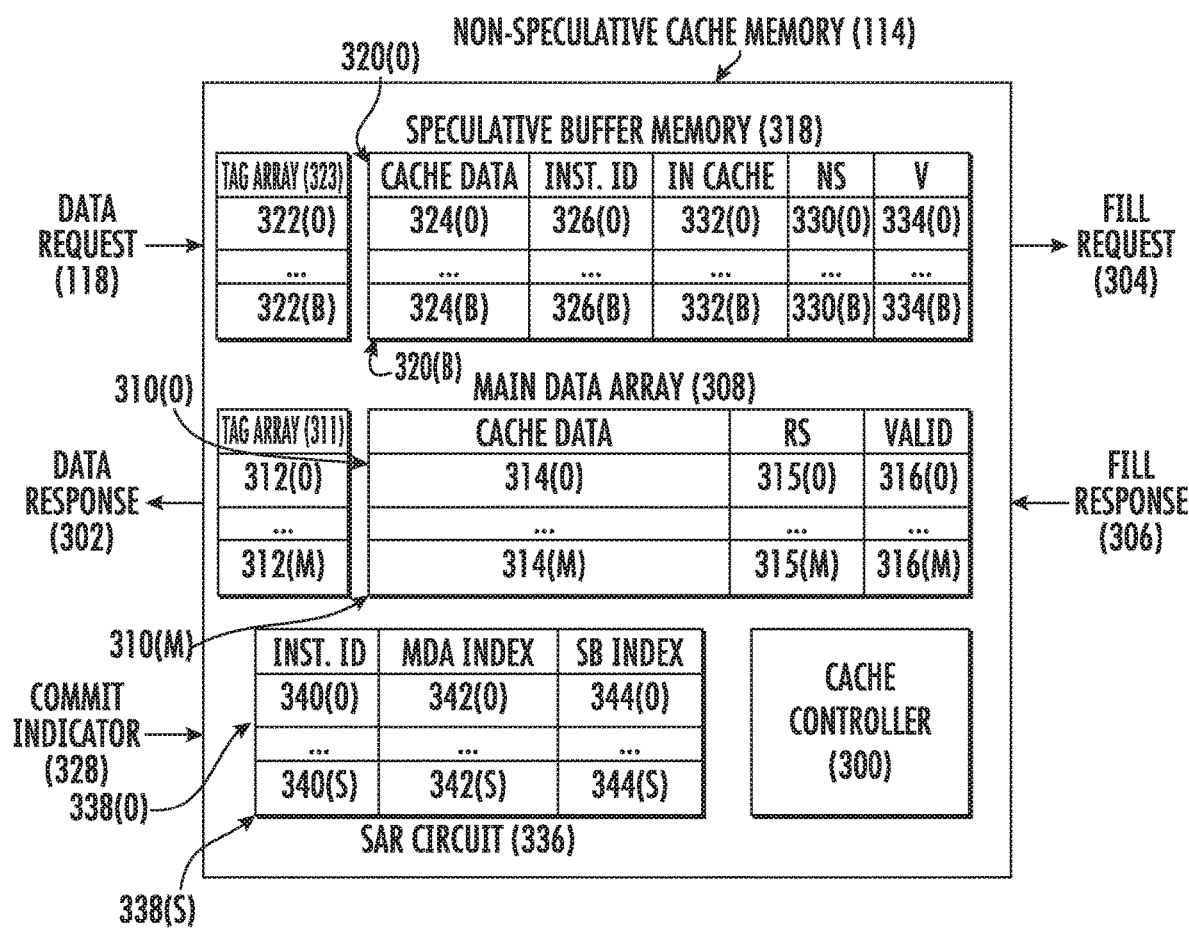
FIG. 3 is a diagram of an exemplary non-speculative cache memory in the cache memory system in FIG. 1.
Figure 5A:
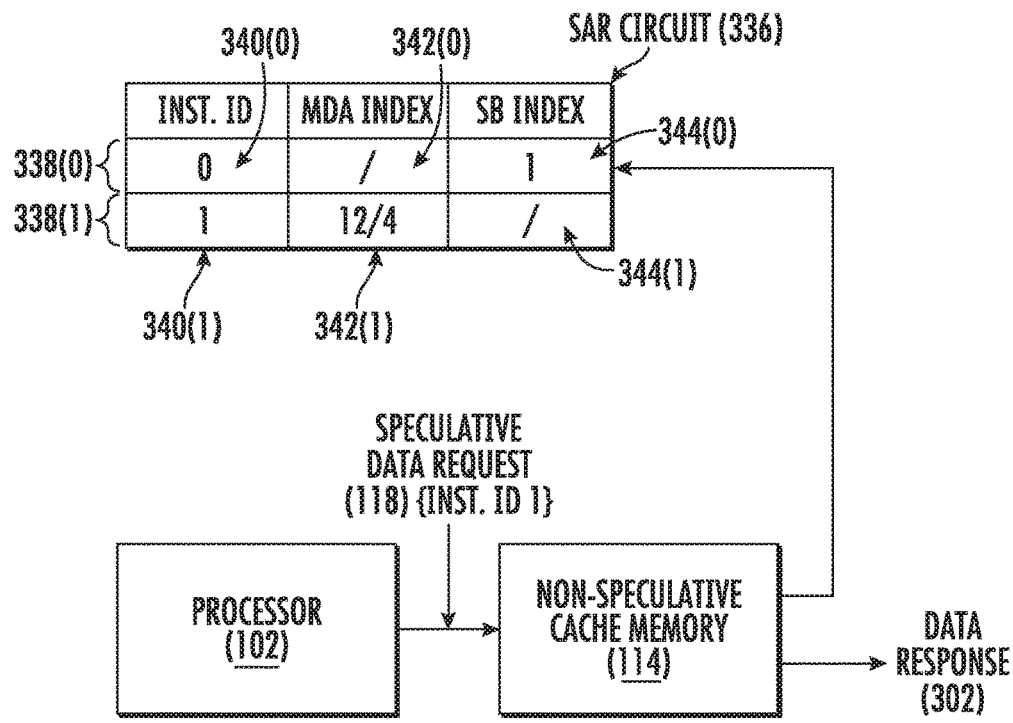
Figure 5B:
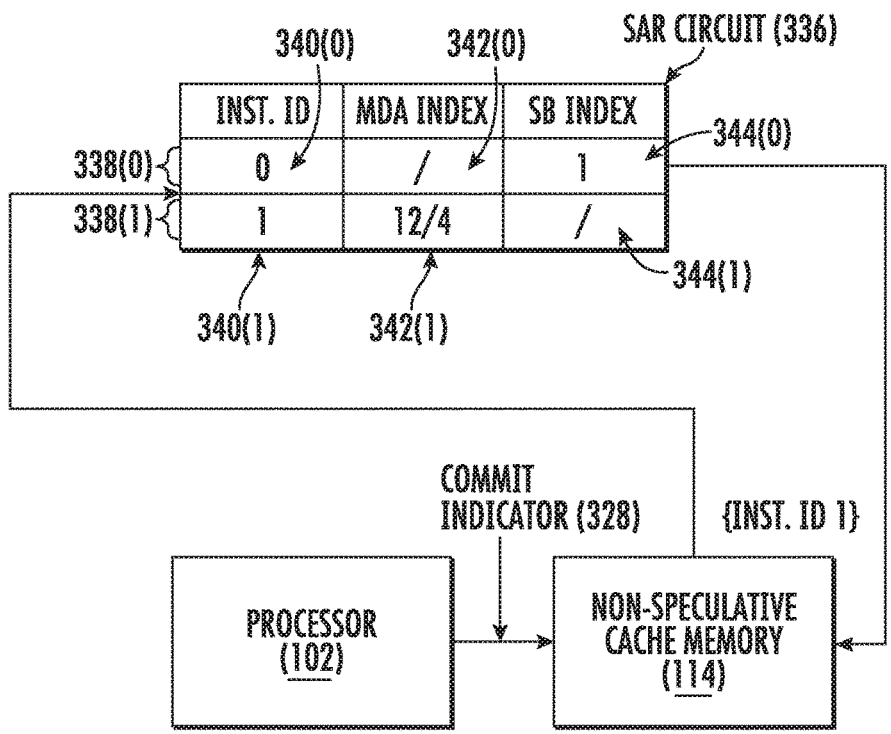
Figure 6A:
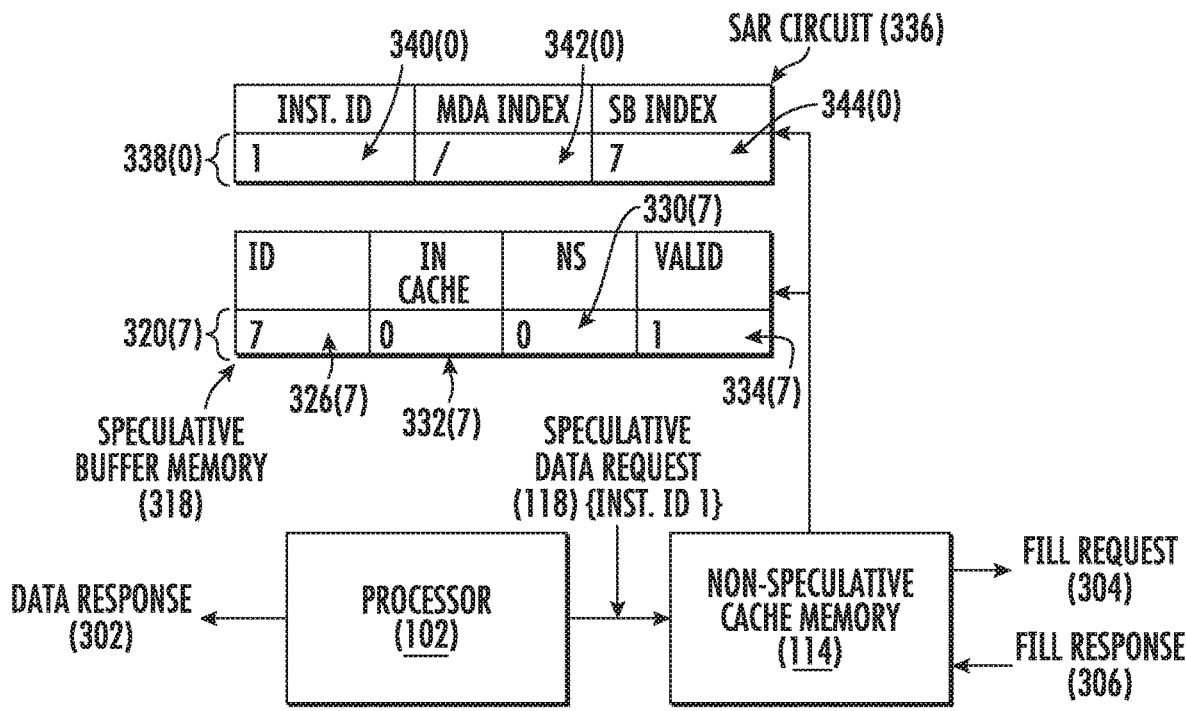
Figure 6B:
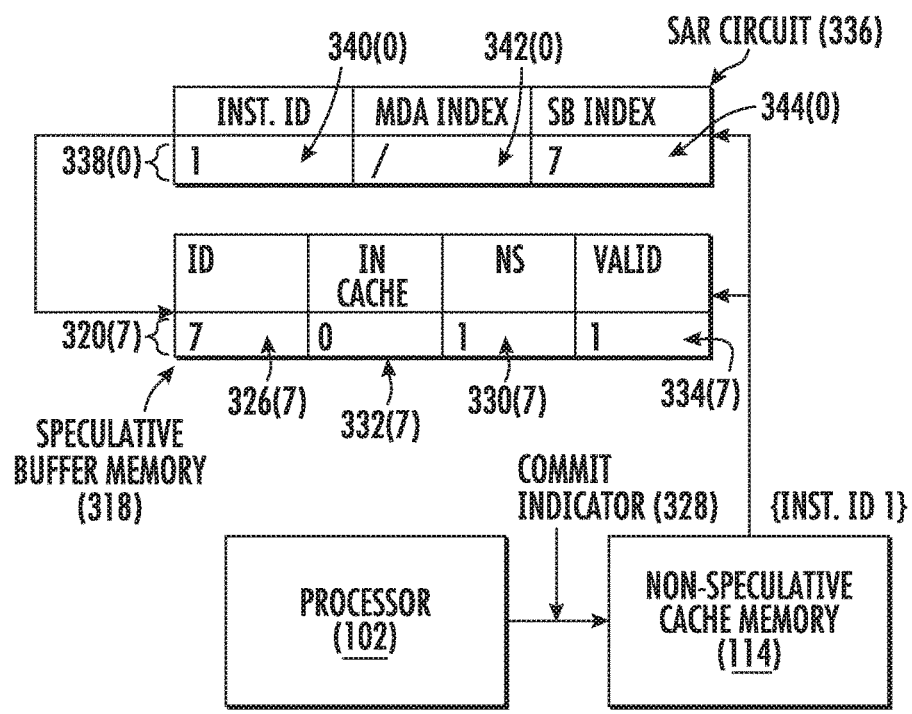
Figure 7A:
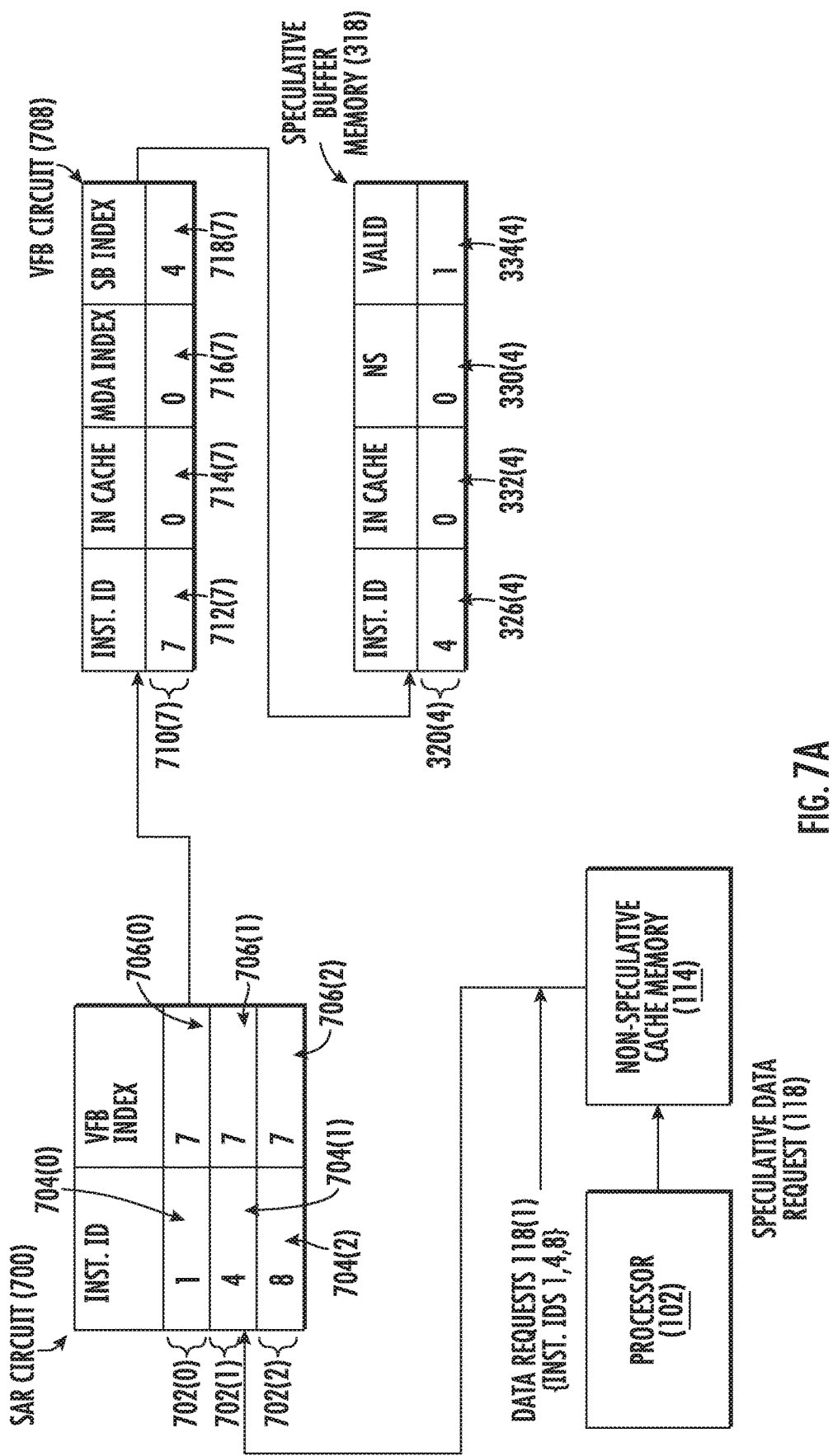
Figure 7B:
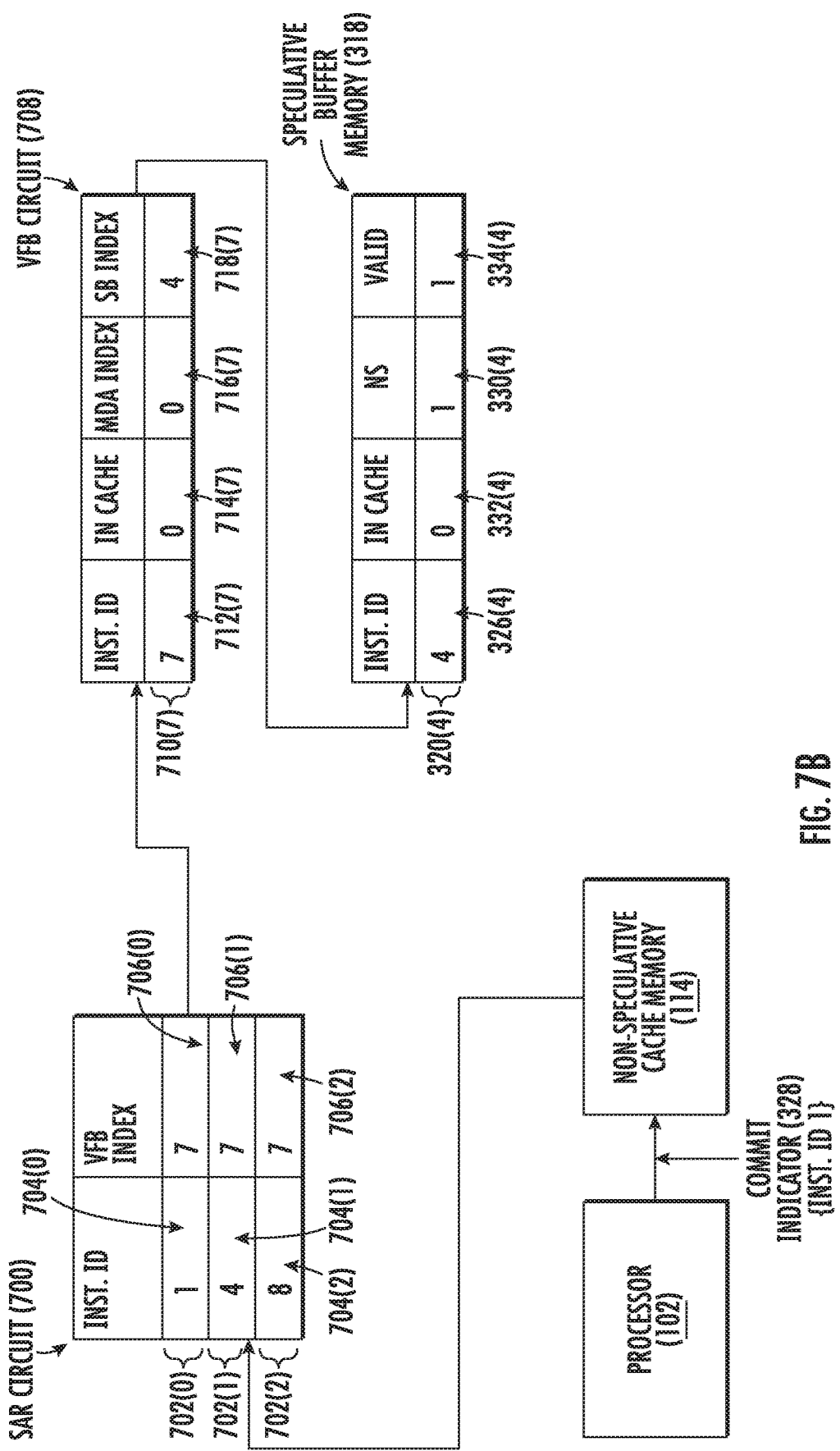
Figure 7C:
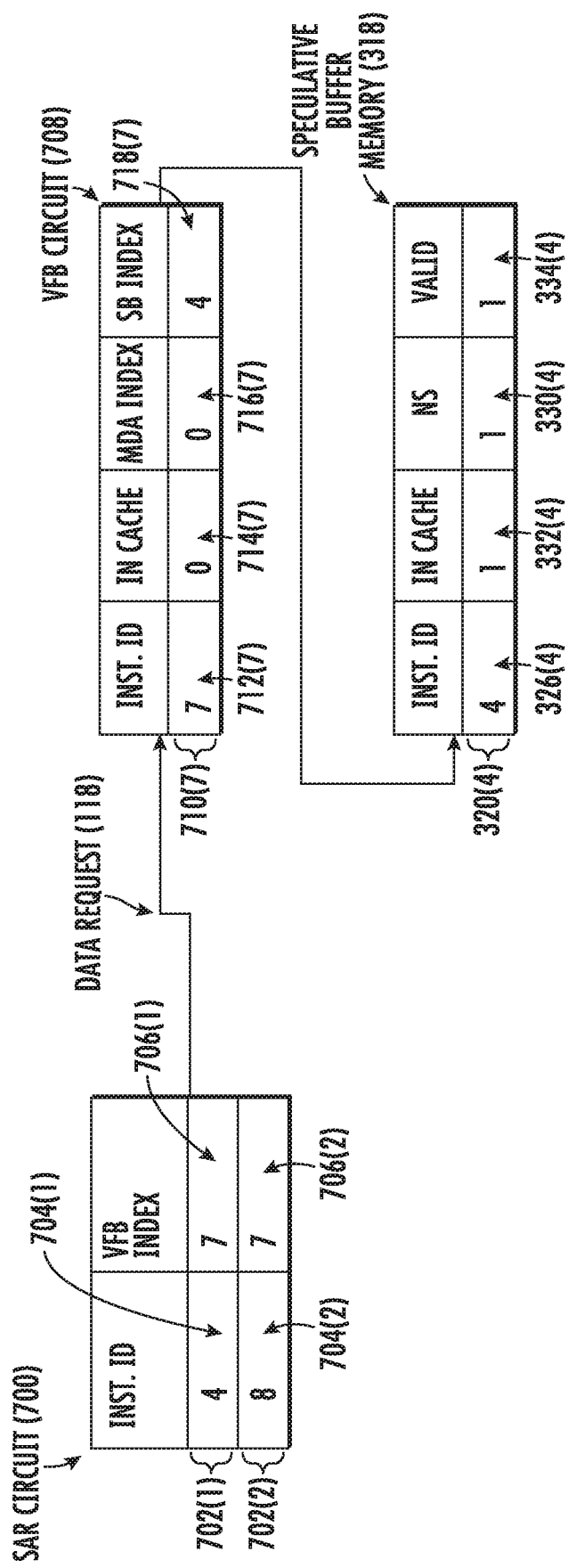
Figure 7D:
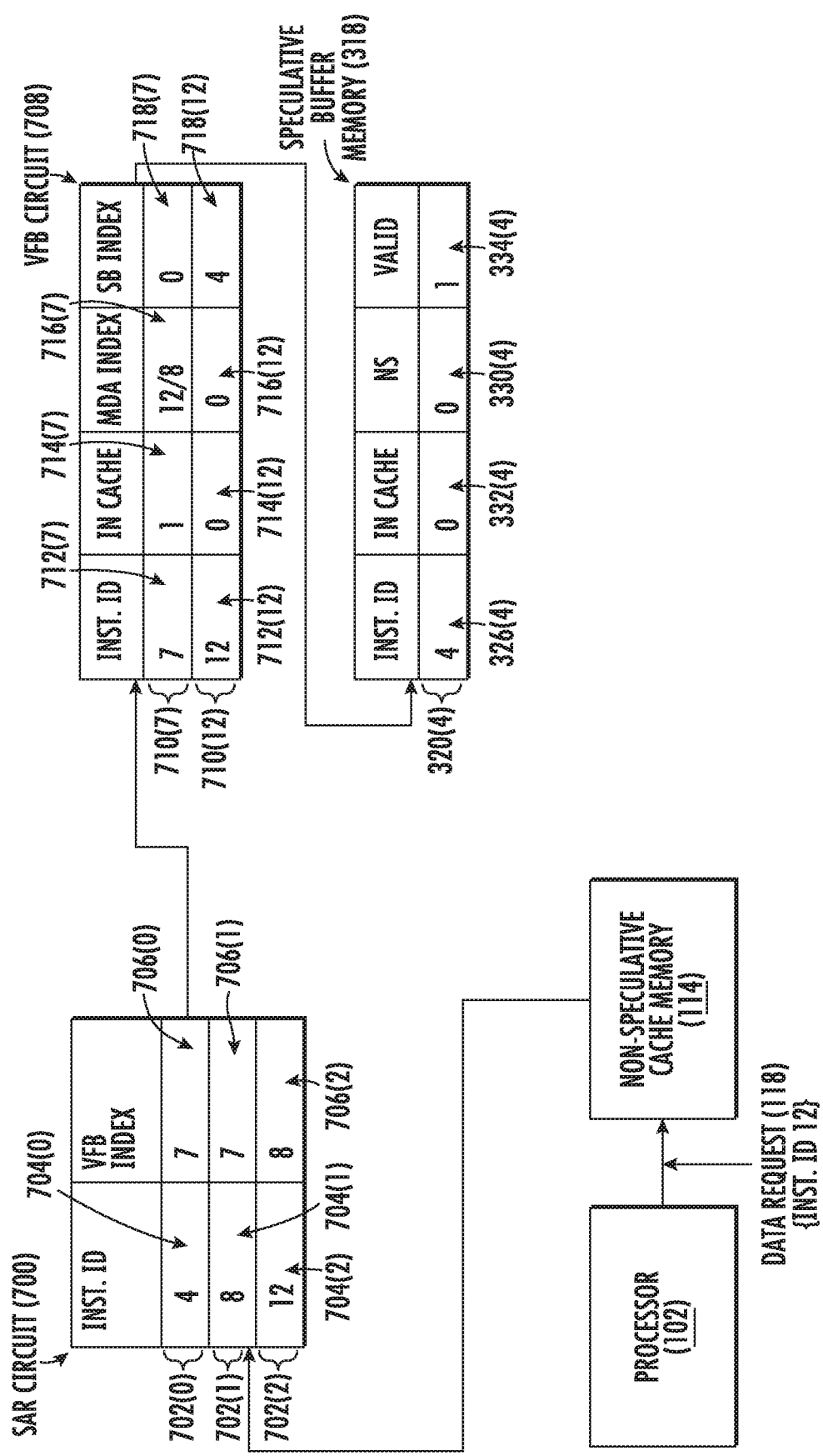
Figure 8:
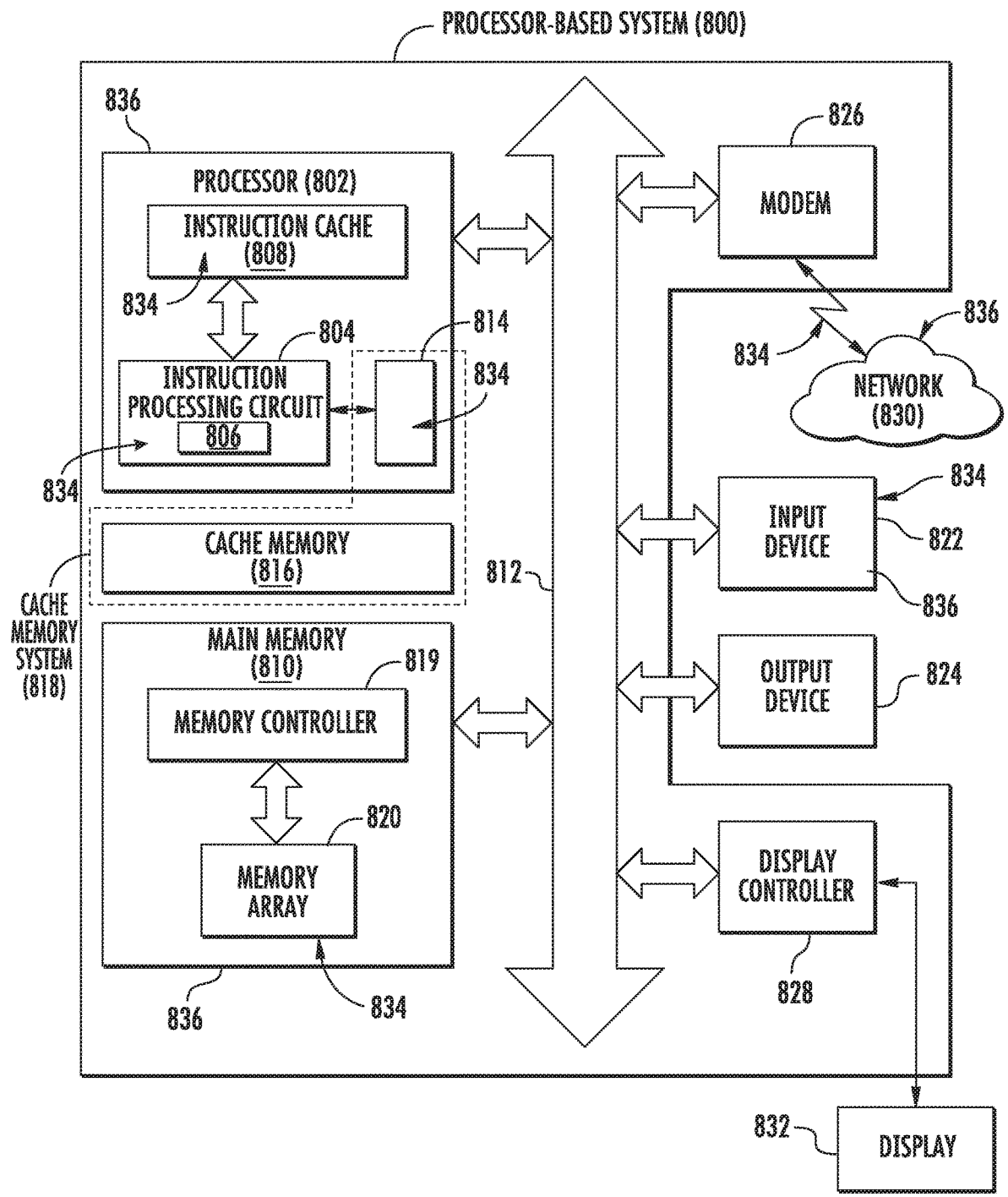

FIG. 5A illustrates the processor in FIG. 1 issuing a data request to the cache memory system resulting in a cache hit in the main data array of a cache memory, wherein the cache controller of the cache memory allocates an entry in a speculative access record (SAR) circuit associated with a load instruction processed by the processor that generated the data request, to record the cache state update deferral for the cache entry in the main data array storing the speculative requested data;

FIG. 5B illustrates the cache memory in FIG. 3 receiving a non-speculative indicator from the processor indicating a load instruction processed by the processor has become non-speculative, and the cache controller in the cache memory accessing the recorded cache state update deferral associated with the load instruction that has become non-speculative so that the cache state of the cache entry in the main data array storing the speculative requested data is updated;

FIG. 6A illustrates the processor in FIG. 1 issuing a data request to the cache memory system resulting in a cache miss in the main data array of a cache memory, and an entry allocated in a speculative access record (SAR) circuit configured to store an index associated with the instruction associated with the data request, to a buffer entry in a speculative buffer memory allocated to store the cache data for the data request, to record the cache state update deferral for the data request;

FIG. 6B illustrates the cache memory in FIG. 3 receiving a non-speculative indicator from the processor indicating a load instruction processed by the processor has become non-speculative, and in response the cache controller in the cache memory accessing the recorded cache state update deferral associated with the load instruction in the speculative buffer memory indexed by an entry in the SAR circuit associated with the instruction associated with the data request, to update a cache state of a cache entry in the main data array storing the requested data;

FIGS. 7A-7D illustrate an example of the processor in FIG. 1 issuing data requests to the cache memory system resulting in cache hits and cache misses in the main data array of a cache memory, and exemplary processing of deferring the updating of cache states for cache data in the main data array associated with the data requests by use of a SAR circuit configured to index a virtual fill buffer circuit, and the virtual fill buffer circuit configured to index the speculative buffer memory to record the deferred cache state updating to be used in updating the cache state associated with the data requests once they become non-speculative; and FIG. 8 is a block diagram of an exemplary processor-based system includes a processor configured to issue memory requests to a memory system that includes a cache memory system and a main memory, wherein the cache memory system includes at least one cache memory, including but not limited to the cache memories in FIGS. 1, 3, 5A-5B, 6A-6B, and 7A-7D configured to defer updating a cache state in response receiving a data request from the processor until the data request becomes non-speculative.

DETAILED DESCRIPTION

Aspects disclosed herein include deferring cache state updates in a non-speculative cache memory in a processor-based system in response to a speculative data request until the speculative data request becomes non-speculative. The processor-based system includes a processor that may include one or more processor cores that execute computer software instructions to perform operations based on loaded data stored in main memory. The processor-based system also includes a cache memory system that includes one or more private and/or shared cache memories organized in a hierarchy between the processor and main memory. Each cache memory has a cache replacement policy that governs which data in its cache entries will be evicted to a higher level cache memory or main memory to make room to store new data requests (i.e., load/read requests). Load-based instructions ("load instructions") that are speculatively processed by the processor as a result of speculatively predicting a condition of a conditional flow control instruction (e.g., a conditional branch instruction) cause data requests to be made to the cache memory system. In exemplary aspects disclosed herein, at least one cache state in a cache memory is deferred from being updated in a cache memory in response to a received data request until the data request becomes non-speculative. This is so the cache memory is not updated based on a data request resulting from a misprediction that should not have been issued had the misprediction occurred, and thus the cache memory is a non-speculative cache memory.

In this manner, cache pollution may be reduced. As another example, an attacker process cannot obtain information about data accesses by a victim process executing in the processor by priming mispredictions in a control prediction circuit that causes data requests to be issued by the victim process resulting in speculatively changed cache states in the cache memory. If data requests that are not resolved as being non-speculative can change a cache state in the cache memory, an attacker application can gain understanding about data accesses by a victim process by understanding the changed cache states in the cache memory.

FIG. 1 is a diagram of an exemplary processor-based system 100 that includes a central processing unit (CPU) or processor 102 configured to issue memory requests (i.e., data read and data write requests) to a memory system 104 that includes a cache memory system 106 and a main memory 108. For example, the main memory 108 may be a dynamic random access memory (DRAM) provided in a separate DRAM chip. The processor 102 includes one or more respective CPU cores 110(1)-110(N), wherein 'N' is a positive whole number representing the number of CPU cores included in the processor 102. The processor 102 can be packaged in an integrated circuit (IC) chip 112. The cache memory system 106 includes one or more cache memories 114(1)-114(X) that may be at different hierarchies in the processor-based system 100 that are logically located between the CPU cores 110(1)-110(N) and the main memory 108, where 'X' is a positive whole number representing the number of CPU cores included in the processor 102. The cache memories store or cache a subset of data contained in main memory 108 to provide the CPU cores 110(1)-110(N) faster access to data in main memory 108 for fulfilling data requests. A memory controller 116 controls access to main memory 108.

For example, a CPU core 110(1)-110(N) as a requesting device may issue a data request 118 to read data in response to processing a load instruction. The data request 118 includes a target address of the data to be read from memory. The data request 118 may also include an instruction identification (ID) identifying the instruction that caused a CPU core 110(1)-110(N) to issue the data request 118. Using CPU core 110(1) as an example, if the requested data is not in a private cache memory 114(1) (i.e., a cache miss to cache memory 114(1)) which may be considered a level one (L1) cache memory, the private cache memory 114(1) sends the data request 118 over an interconnect bus 117 in this example to a shared cache memory 114(X) shared to all the CPU cores 110(1)-110(N), which may be a level (3) cache memory. Other shared cache memories 114(2), 114(3) with the processor 102 only shared with a subset of CPU cores 110(1)-110(N) may also be considered a level two (2) cache memory. The requested data is eventually either obtained in a cache memory 114(1)-114(X) or main memory 108 if not contained in any of the cache memories 114(1)-114(X). Data received by a cache memory 114(1)-114(X) from a higher level cache memory 114(1)-114(X) or main memory 108 due to a cache miss causes the receiving cache memory 114(1)-114(N) to evict a cache data out to a higher level memory to make room for the new cache data. Each cache memory 114(1)-114(X) has a cache replacement policy that governs which of its cache data will be evicted to a higher level cache memory 114(1)-114(X) or main memory 108 to make room to store new cache data for the data request 118 that resulted in a cache miss.

Figure 2:
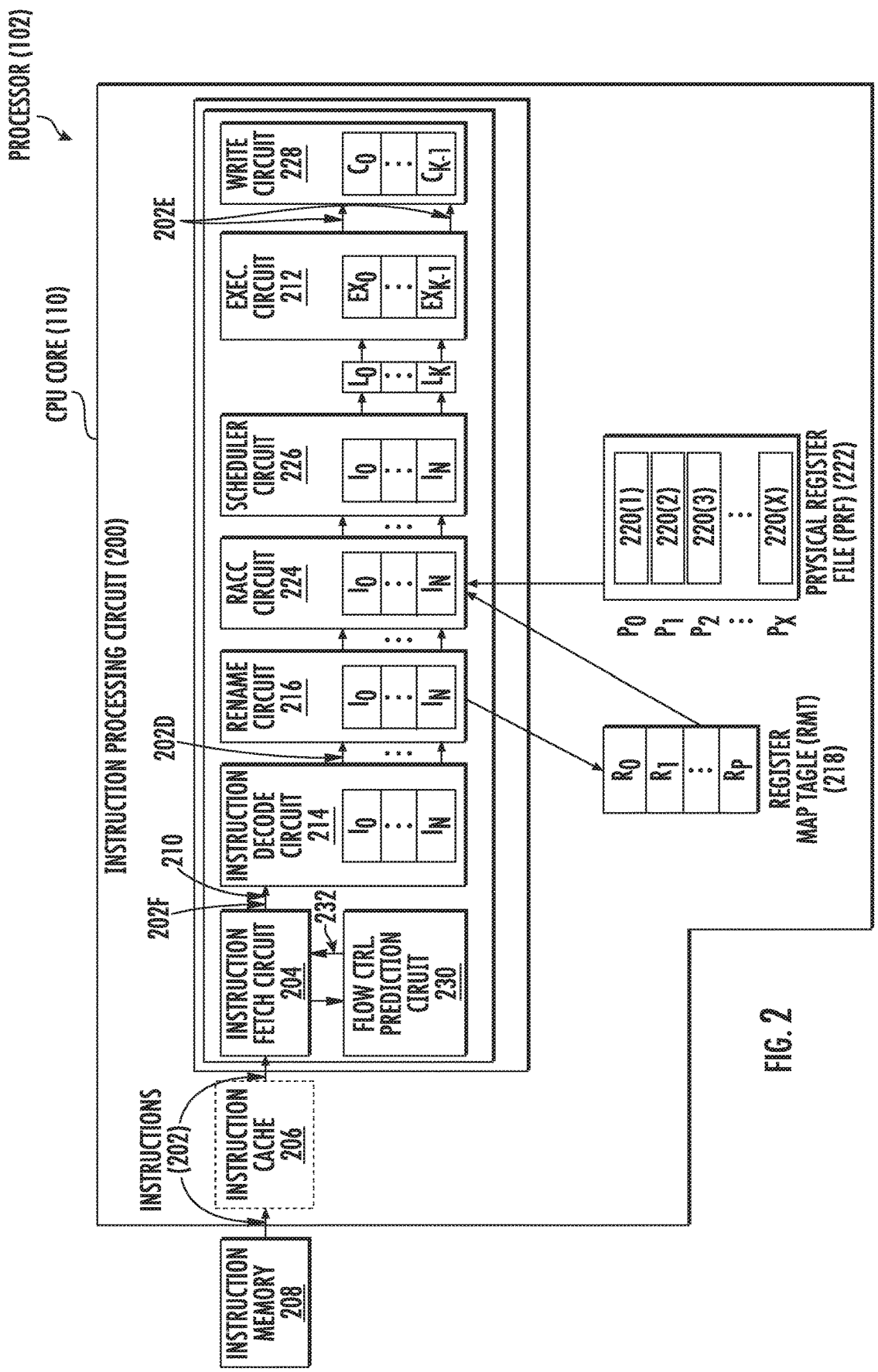

FIG. 2 illustrates an instruction processing circuit 200 that is provided in a CPU core 110, which can be any of the CPU cores 110(1)-110(N) in the processor 102 in FIG. 1. The instruction processing circuit 200 includes one or more instruction pipelines $I_0$-$I_N$ for processing fetched computer instructions 202F fetched by an instruction fetch circuit 204 for execution from a series of instructions 202 stored in an instruction cache memory 206 or instruction memory 208, as examples. The instruction cache memory 206 may be provided as part of a cache memory 114(1)-114(X) in the cache memory system 106 in the processor-based system 100 in FIG. 1. The instruction memory 208 may be provided in or as part of the main memory 108 in the processor-based system 100 in FIG. 1. The instruction fetch circuit 204 is configured to provide fetched instructions 202F into the one or more instruction pipelines $I_0$-$I_N$ as an instruction stream 210 in the instruction processing circuit 200 to be pre-processed, before the fetched instructions 202F reach an execution circuit 212 to be executed. The instruction pipelines $I_0$-$I_N$ are provided across different processing circuits or stages of the instruction processing circuit 200 to pre-process and process the fetched instructions 202F in a series of steps that can be performed concurrently to increase throughput prior to execution of the fetched instructions 202F by the execution circuit 212.

With continuing reference to FIG. 2, the instruction processing circuit 200 includes an instruction decode circuit 214 configured to decode the fetched instructions 202F fetched by the instruction fetch circuit 204 into decoded instructions 202D to determine the instruction type and actions required. The decoded instructions 202D are placed in one or more of the instruction pipelines $I_0$-$I_N$ and are next provided to a rename circuit 216 in the instruction processing circuit 200 to determine if any register names in the decoded instructions 202D need to be renamed to break any register dependencies that would prevent parallel or out-of-order processing. The rename circuit 216 is configured to call upon a register map table (RMT) 218 to rename a logical source register operand and/or write a destination register operand of a decoded instruction 202D to available physical registers 220(1)-220(X) ($P_0$, $P_1$, . . . , $P_x$) in a physical register file (PRF) 222. The RMT 218 contains a plurality of mapping entries each mapped to (i.e., associated with) a respective logical register $R_0$-$R_P$. The mapping entries are configured to store information in the form of an address pointer to point to a physical register 220(1)-220(X) in the physical register file (PRF) 222. Each physical register 220(1)-220(X) in the PRF 222 contains a data entry configured to store data for the source and/or destination register operand of a decoded instruction 202D.

The instruction processing circuit 200 also includes a register access (RACC) circuit 224 configured to access a physical register 220(1)-220(X) in the PRF 222 based on a mapping entry mapped to a logical register $R_0$-$R_P$ in the RMT 218 of a source register operand of a decoded instruction 202D to retrieve a produced value from an executed instruction 202E in the execution circuit 212. The RACC circuit 224 is also configured to provide the retrieved produced value from an executed decoded instruction 202E as the source register operand of a decoded instruction 202D to be executed. Also, in the instruction processing circuit 200, a scheduler circuit 226 is provided in the instruction pipeline $I_0$-$I_N$ and is configured to store decoded instructions 202D in reservation entries until all source register operands for the decoded instruction 202D are available. The scheduler circuit 226 issues decoded instructions 202D ready to be executed in an execution lane $L_0$-$L_K$ to the execution circuit 212. A write circuit 228 is also provided in the instruction processing circuit 200 to write back or commit produced values from executed instructions 202E to memory, such as the PRF 222, cache memory system 106 or main memory 108.

With continuing reference to FIG. 2, the instruction processing circuit 200 also includes a flow control prediction circuit 230. The flow control prediction circuit 230 is configured to speculatively predict the outcome of a condition of a fetched conditional flow control instruction 202F, such as a conditional branch instruction, that controls whether the taken or not taken path in the instruction control flow path of the instruction stream 210 is fetched into the instruction pipelines $I_0$-$I_N$ for execution. In this manner, the condition of the fetched conditional flow control instruction 202F does not have to be resolved in execution by the execution circuit 212 before the instruction processing circuit 200 can continue processing speculatively fetched instructions 202F. The prediction made by the flow control prediction circuit 230 can be provided as prediction information 232 to the instruction fetch circuit 204 to be used by the instruction fetch circuit 204 to determine the next instructions 202 to fetch.

However, if the condition of the conditional flow control instruction 202F is determined to have been mispredicted when the conditional flow control instruction 202F is executed in the execution circuit 212, the speculative fetched instructions 202F that were fetched behind the conditional flow control instruction 202F and processed in the instruction processing circuit 202 are flushed since these instructions should not have been processed. The instruction processing circuit 202 is returned to a state that existed prior to when the conditional flow control instruction 202F was processed. The speculative fetched instructions 202F that get flushed in response to a misprediction may have included load-based instructions ("load instructions") that issued speculative data requests 118 to the cache memory system 106 in the processor-based system 100 in FIG. 1. If such speculative data requests 118 resulted in cache misses, data is evicted from the cache memory system 106 to make room for the data response to any such speculative data requests 118. This can cause cache pollution. This can also cause security issues. For example, a malicious attacker process executing in the processor 102 may learn information about data accessed by victim process executing in the processor 102 based on incorrectly speculative data loaded into the cache memory system 106. A malicious attacker process could prime the cache memory system 106 with its own data and prime the flow control prediction circuit 230 to make mispredictions for conditional flow control instructions 202F in the victim process causing incorrectly speculative data to be loaded into the cache memory system 106. The attacker application could learn information about the victim process based on which of the primed victim data in the cache memory system 106 was replaced by the incorrectly speculative data to be loaded into the cache memory system 106.

In this regard, one or more of the cache memories 114(1)-114(X) in the cache memory system 106 in the processor-based system 100 in FIG. 1 can be configured to be non-speculative cache memories. A non-speculative cache memory is configured defer the updating of cache state of a cache entry for a received data request 118 from being updated until the data request becomes non-speculative. For example, FIG. 3 illustrates an example of a cache memory 114 in the processor-based system 100 in FIG. 1 configured as a non-speculative cache memory 114. As shown in FIG. 3, the non-speculative cache memory 114 includes a cache controller 300 that is a circuit configured to control the operations of the non-speculative cache memory 114 including handling data requests 118 for access to cache data stored in the non-speculative cache memory 114, providing data responses 302 of cache data to a requestor, fill requests 304 to obtain cache data from a higher-level memory in response to a cache miss for a received data request 118, and fill responses 306 with the cache data received from a higher-level memory in response to a fill request 304.

The non-speculative cache memory 114 also includes a main data array 308 that includes a plurality of cache entries 310(0)-310(M) each configured to store cache data 314(0)-314(M) stored in the memory system 104 of FIG. 1 at a memory address associated with the respective tag 312(0)-312(M). The non-speculative cache memory 114 also includes a tag array 311 that is configured to store a plurality of tags 312(0)-312(M) corresponding to the respective cache entries 310(0)-310(M). The main data array 308 may also include a cache replacement state 315(0)-315(M) in each respective cache entry 310(0)-310(M) to indicate a replacement state for the associated cache entry 310(0)-310(M) used by the cache controller 300 to determine which cache entry 310(0)-310(M) to evict when new data for a non-speculative data request 118 needs to be stored in the main data array 308. The main data array 308 may also include a valid indicator 316(0)-316(M) in each respective cache entry 310(0)-310(M) to indicate if the cache data 314(0)-314(M) is valid. The non-speculative cache memory 114 in this example also includes a speculative buffer memory 318 that includes a plurality of buffer entries 320(0)-320(B) each configured to store cache data 324(0)-324(B) stored in the memory system 104 at a memory address associated with a respective buffer tag 322(0)-322(B). The non-speculative cache memory 114 also includes a tag array 323 that is configured to store the buffer tags 322(0)-322(B) associated with a respective buffer entry 320(0)-320(B). For example, the speculative buffer memory 318 may be a fill buffer for the non-speculative cache memory 114 that acts as a staging area for incoming data in a fill response 306 in response to an issued fill request 304 to be stored in the non-speculative cache memory 114 until a cache entry 310(0)-310(M) in the main data array 308 becomes available to store the incoming data.

With continuing reference to FIG. 3, the speculative buffer memory 318 also includes an instruction identifier (ID) 326(0)-326(B) in each respective buffer entry 320(0)-320(B) to store an instruction ID of a load instruction that issued a data request 118 to the non-speculative cache memory 114 to track if and when the data request 118 becomes non-speculative. The cache controller 300 is configured to update a cache state associated with the data request 118 in a cache entry 310(0)-310(M) in the main data array 308 associated with the data request 118 after the instruction that caused the data request 118 to be issued becomes non-speculative in the processor 102. As will be discussed in more detail below, the cache controller 300 is configured to allocate a buffer entry 320(0)-320(B) in the speculative buffer memory 318 in response to a received data request 118. The cache controller 300 is configured to initially update a respective speculative indicator (NS) 330(0)-330(B) with a speculative state in each buffer entry 320(0)-320(B) for a received data request 118 as speculative. Each buffer entry 320(0)-320(B) in the speculative buffer memory 318 also includes an in-cache indicator 332(0)-332(B) indicating if data for the associated buffer entry 320(0)-320(B) is stored in a cache entry 310(0)-310(M) in the main data array 308, and a valid indicator 334(0)-334(B) indicating if the buffer entry 320(0)-320(B) is valid. The non-speculative cache memory 114 is configured to receive a commit indicator 328 issued by the processor 102 containing an instruction ID of an instruction that is non-speculative. The cache controller 300 can use the received instruction ID in the commit indicator 328 to search the instruction IDs 326(0)-326(B) in speculative buffer memory 318 to update a respective non-speculative indicator (NS) 330(0)-330(B) in each buffer entry 320(0)-320(B). The cache controller 300 can then update a cache state for the data associated data request 118 in a cache entry 310(0)-310(M) in the main data array 308 in response to the non-speculative indicator (NS) 330(0)-330(B) for the data request 118 becoming non-speculative.

For example, if a load-instruction 202D that is speculatively processed based on a control flow prediction in the processor 102 in FIG. 2 causes the processor 102 to issue a data request 118 for data to the non-speculative cache memory 114 in FIG. 3, the cache controller 300 is configured to search the tag array 311 for a tag 312(0)-312(M) in a cache entry 310(0)-310(M) associated with a target address of the data request 118 to determine if the data for the data request 118 is present. The cache controller 300 is also configured to search the speculative buffer memory 318 for a buffer tag 322(0)-322(B) in the tag array 323 corresponding to a buffer entry 320(0)-320(B) associated with a target address of the data request 118 to determine if the data for the data request 118 is present in the speculative buffer memory 318. If a cache miss occurs where the data for the data request 118 is not present in either the main data array 308 or the speculative buffer memory 318, the cache controller 300 issues a fill request 304 for the data from a higher level memory and receives the requested data as a fill response 306. The cache controller 300 may be configured to defer updating of a cache state for the data request 118 by not initially storing received data in the fill response 306 for the data request 118 in a cache entry 310(0)-310(M) in main data array 308. Instead, the received data for the data request 118 may be first stored as cache data 324(0)-324(B) in an allocated buffer entry 320(0)-320(B) in the speculative buffer memory 318 so as to not contaminate the main data array 308 with speculative data. When the data request 118 becomes non-speculative as indicated by the instruction ID in the commit indicator 328 matching an instruction ID 326(0)-326(B) in a buffer entry 320(0)-320(B) in the speculative buffer memory 318, the cache controller 300 can cause the data for the data request 118 to be stored in an allocated cache entry 310(0)-310(M) in the main data array 308.

In another example, when a target address of the data request 118 corresponds to a matched tag 312(0)-312(M) in the tag array 311 in the non-speculative cache memory 114, a cache hit results. This means the data for the data request 118 is already contained in a cache entry 310(0)-310(M) in the main data array 308 corresponding to the matched tag 312(0)-312(M). The cache data 314(0)-314(M) for the data request 118 stored in a respective cache entry 310(0)-310 (M) is returned as a data response 302 to the requestor in the processor 102. However, the updating of a cache replacement state 315(0)-315(M) of the cache entry 310(0)-310(M) that has the cache data 314(0)-314(M) for the data request 118 may be deferred until the data request 118 becomes non-speculative. This is so, for example, the replacement policy of the non-speculative cache memory 114 will not be performed based on a replacement cache state for a cache entry 310(0)-310(M) in the main data array 308 that was altered by a speculative data request 118 that may be flushed in the processor 102 due to a misprediction making the updating of the cache state invalid.

In another example, if the data request 118 issued from the processor 102 the non-speculative cache memory 114 is not contained in a cache entry 310(0)-310(M) in the main data array 308, but is contained in a buffer entry 320(0)-320(B) in the speculative buffer memory 318, the corresponding cache data 324(0)-324(B) for the data request 118 is returned to the requestor in the processor 102 as a data response 302. However, the cache controller 300 may be configured to defer updating of a cache state for the data request 118 by not storing the data in the speculative buffer memory 318 for the data request 118 in a cache entry 310(0)-310(M) in main data array 308 so as to not contaminate the main data array 308 with speculative data. When the data request 118 becomes non-speculative as indicated by the instruction ID in the commit indicator 328 matching an instruction ID 326(0)-326(B) in a buffer entry 320(0)-320(B) in the speculative buffer memory 318, the cache controller 300 can cause the data for the data request 118 to be stored in an allocated cache entry 310(0)-310(M) in the main data array 308. Thus, as another example, if a later cache hit occurs on such allocated cache entry 310(0)-310(M) for a new, subsequent data request 118, the updating of cache replacement state 315(0)-315(M) of the cache entry 310(0)-310(M) in the main data array 308 that has the cache data 314(0)-314(M) for the data request 118 will deferred until the data request 118 becomes non-speculative as discussed above for a cache hit to the main data array 308.

Figure 4:
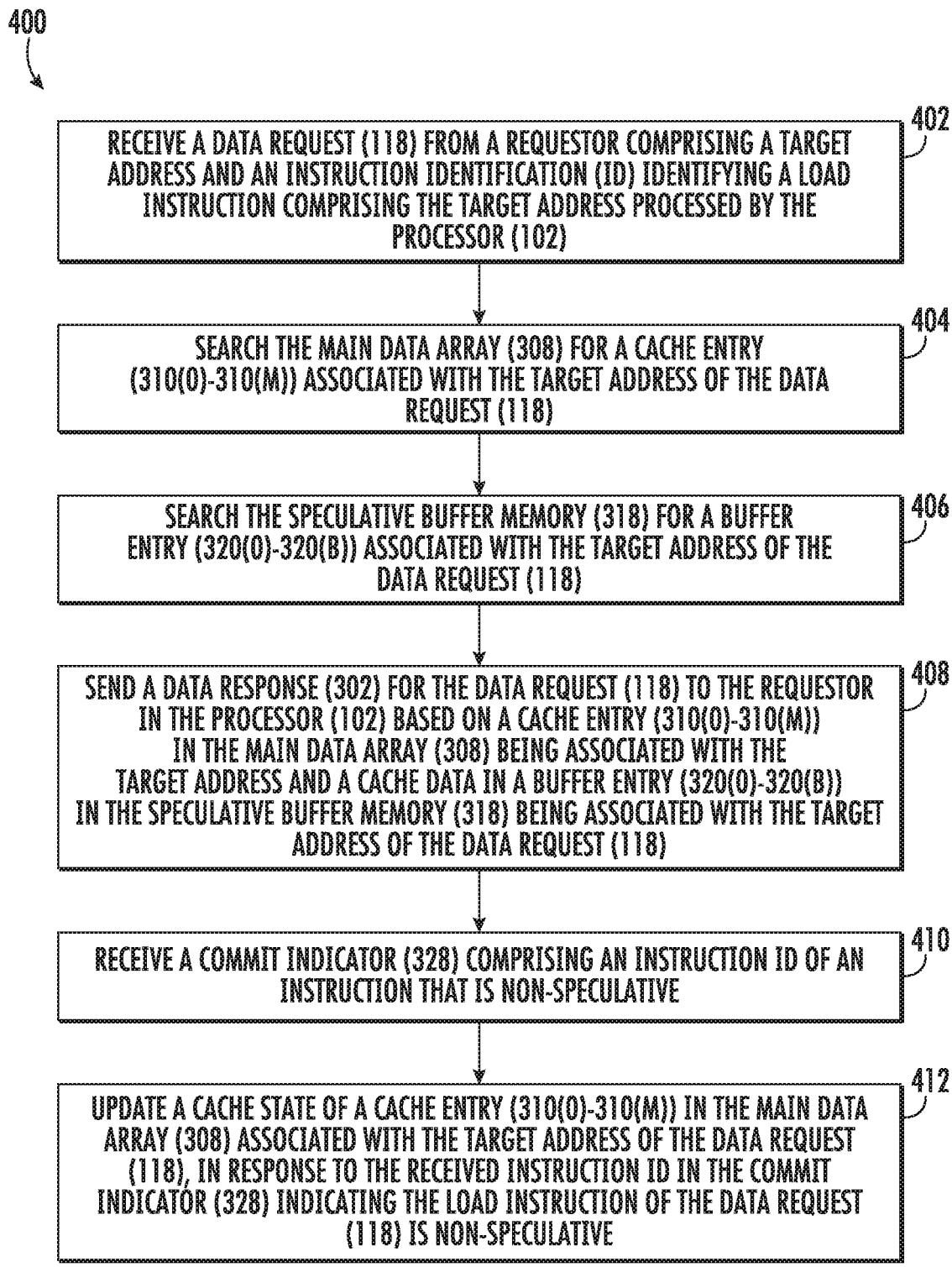
FIG. 4 is a flowchart illustrating an exemplary process of a cache controller in the cache memory in FIG. 3 deferring updating a cache state of data for a received data request that is speculative and updating the deferred cache state in the main data array for the data associated with the data request in response to the data request becoming non-speculative.

FIG. 4 is a flowchart illustrating an exemplary process 400 of the cache controller 300 in the non-speculative cache memory 114 in FIG. 3 deferring updating a cache state of data for a received data request 118 that is speculative. The process 400 in FIG. 4 also includes updating the deferred cache state in the main data array 308 for the data associated with the data request 118 in response to the data request 118 becoming non-speculative. The process 400 in FIG. 4 will be discussed in conjunction with the non-speculative cache memory 114 in FIG. 3 and the processor 102 in FIGS. 1 and 2. In this regard, the non-speculative cache memory 114 receives a data request 118 from a requestor comprising a target address and an instruction identification (ID) identifying a load instruction comprising the target address processed by the processor 102 (block 402 in FIG. 4). The cache controller 300 searches the tag array 311 for a tag 312(0)-312(M) associated with the target address of the data request 118 (block 404 in FIG. 4). The cache controller 300 also searches the speculative buffer memory 318 for a buffer tag 322(0)-322(B) associated with the target address of the data request 118 (block 406 in FIG. 4). The cache controller 300 sends a data response 302 for the data request 118 to the requestor in the processor 102 based on a tag 312(0)-312(M) in a cache entry 310(0)-310(M) in the main data array 308 being associated with the target address and a buffer tag 322(0)-322(B) in the tag array 323 in the speculative buffer memory 318 being associated with the target address of the data request 118 (block 408 in FIG. 4). The cache controller 300 receives a commit indicator 328 comprising an instruction ID of an instruction that is non-speculative (block 410 in FIG. 4). In response to the received instruction ID in the commit indicator 328 indicating the load instruction of the data request 118 is non-speculative, the cache controller 300 updates a cache state of a cache entry 310(0)-310(M) in the main data array 308 associated with the target address of the data request 118 (block 412 in FIG. 4).

As will also be discussed in more detail below, the non-speculative cache memory 114 may also include a speculative access record (SAR) circuit 336 to track whether data associated with a data request 118 not yet known to be non-speculative is contained in the main data array 308 or the speculative buffer memory 318. As discussed above, data for a received data request 118 may already be contained in the main data array 308 resulting in a cache hit, may already be contained in the speculative buffer memory 318 also resulting in a cache hit, or not contained in either resulting in a cache miss. In the event of a cache miss, a buffer entry 320(0)-320(B) to store the data of the data request 118 is allocated in the speculative buffer memory 318. Thus, data for a data request 118 may be stored in either the main data array 308 or the speculative buffer memory 318. In response to receiving a commit indicator 328 indicating an instruction ID of an instruction that has been committed by the processor 102, the cache controller 300 needs a way to determine if data associated with the data request 118 issued as a result of an instruction matching the instruction ID is stored in the main data array 308 or the speculative buffer memory 318 so that the cache state can be updated. If the data associated with a committed instruction of identified by the instruction ID in the commit indicator 328 is stored in the main data array 308, the cache controller 300 needs to update the cache state of the cache entry 310(0)-310(M) in the main data array 308 storing the data for the committed data request 118. If the data associated with a committed instruction of identified by the instruction ID in the commit indicator 328 is stored in the speculative buffer memory 318, the cache controller 300 needs to update the non-speculative indicator (NS) 330(0)-330(B) of the buffer entry 320(0)-320(B) in the speculative buffer memory 318. The cache controller 300 updates the non-speculative indicator (NS) 330(0)-330(B) of the buffer entry 320(0)-320(B) associated with the instruction ID as non-speculative so that the data associated with the committed data request 118 is written to the main data array 308 as non-speculative data.

In this regard, as illustrated in FIG. 3, the non-speculative cache memory 114 includes the SAR circuit 336 that is configured to store SAR entries 338(0)-338(S) associated with a respective instruction ID 340(0)-340(S). When a data request 118 is received, the cache controller 300 allocates a SAR entry 338(0)-338(S) allocated in the SAR circuit 336 associated with the instruction ID of the instruction that issued the data request 118. If the data associated with an instruction identified by the instruction ID of the received data request 118 is already stored in a cache entry 310(0)-310(M) in the main data array 308, a main data array (MDA) index 342(0)-342(S) for the allocated SAR entry 338(0)-338(S) is updated with an index into the cache entry 310(0)-310(M) in the main data array 308 that contains the data for the data request 118. If the data associated with an instruction identified by the instruction ID of the received data request 118 is not stored in a cache entry 310(0)-310(M) in the main data array 308, but is stored in a buffer entry 320(0)-320(B) in the speculative buffer memory 318, a speculative buffer (SB) index 344(0)-344(S) for the allocated SAR entry 338(0)-338(S) is updated with an index into a buffer entry 320(0)-320(B) in the speculative buffer memory 318 that contains the data for the data request 118. If the data associated with an instruction identified by the instruction ID of the received data request 118 is not stored in a cache entry 310(0)-310(M) in the main data array 308 or a buffer entry 320(0)-320(B) in the speculative buffer memory 318 resulting in a cache miss, a speculative buffer (SB) index 344(0)-344(S) for the allocated SAR entry 338(0)-338(S) is updated with an index into a buffer entry 320(0)-320(B) in the speculative buffer memory 318 that contains the data for the data request 118 received from the fill response 306 from a higher level memory in response to a fill request 304. As discussed above, allocating a SAR entry 338(0)-338(S) for data requests 118 in the SAR circuit 336 allows the cache controller 300 determine whether to update the cache state of data associated with a data request 118 that has become non-speculative in the main data array 308 or speculative buffer memory 318.

To illustrate an example of the use of the SAR circuit 336 by the non-speculative cache memory 114 to track recorded speculative data requests and to be able to defer updating a cache state in the non-speculative cache memory 114 until the data request becomes non-speculative, FIGS. 5A and 5B are provided. FIG. 5A illustrates the processor 102 in FIG. 1 issuing a data request 118 comprising an instruction ID and target address that is received by a non-speculative cache memory 114 resulting in a cache hit in the main data array 308 of the non-speculative cache memory 114. In this example, the instruction ID in the data request 118 identifying the processing instruction that caused the data request 118 to be issued is instruction ID 1. The cache controller 300 in the non-speculative cache memory 114 is configured to search the main data array 308 and the speculative buffer memory 318 to search for the data corresponding to the target address of the data request 118. In this example, the data corresponding to the target address of the data request 118 is contained in the main data array 308 resulting in a cache hit. The data for the data request 118 in the main data array 308 is returned as a data response 302 to the requestor in the processor 102. However, the instruction identified by instruction ID 1 that caused the data request 118 to be issued is deemed speculative until the commit indicator 328 is received by the non-speculative cache memory 114 indicating otherwise as previously discussed. The cache controller 300 in the non-speculative cache memory 114 is configured to allocate the SAR entry 338(1) in the SAR circuit 336 in shown in FIG. 5A associated with an instruction ID 1 to record deferral of a cache state update in the main data array 308 for the data request 118. As shown in FIG. 5A, instruction ID 1 is stored in the instruction ID 340(1) of the SAR entry 338(1). Since the data request 118 resulted in a cache hit to the main data array 308 in the non-speculative cache memory 114, the cache set/way of '12/4' of the cache entry 310(0)-310(M) in the main data array 308 that contains the data for the data request 118 is stored in the MDA index 342(1). In this regard, the cache controller 300 can later locate the cache entry 310(0)-310(M) in the main data array 308 based on the MDA index 342(1) to have its cache state updated when instruction ID 1 is indicated as committed according to a received commit indicator 328. Note that a null is stored in the SB index 344(1) for the SAR entry 338(1), because the data for the data request 118 is in the main data array 308 and not in the speculative buffer memory 318. Note that in this example, the SAR entry 338(0) records the location of data for a previous data request 118 in SB index 344(0) corresponding to entry 1 in the speculative buffer memory 318. Also note that an allocated SAR entry 338(0)-338(S) can optionally be augmented by the cache controller 300 with information pertaining to a delayed cache replacement policy update. For instance, a SAR entry 338(0)-338(S) could be marked as a most recently used (MRU) entry in a least recently used (LRU) cache replacement policy.

FIG. 5B illustrates an example of the processor 102 in FIG. 5A receiving a commit indicator 328 identifying instruction ID 1 as being committed. In response, the cache controller 300 is configured to search the SAR circuit 336 to determine if a SAR entry 338 contains instruction ID 1 in an instruction ID 340(0)-340(S) to indicate that the updating of cache state of the data request 118 associated with instruction ID 1 was deferred. In this example, instruction ID 1 is contained in SAR entry 338(1) in response to the received data request 118 caused by the processing of instruction ID 1 as illustrated in FIG. 5A and previously described. The cache controller 300 is configured to, in response to determining instruction ID 1 is contained in SAR entry 338(1), update the cache replacement state 315(0)-315(M) in the cache entry 310(0)-310(M) in the main data array 308 indexed by the MDA index 342(1). This is because cache entry 310(0)-310(M) in the main data array 308 indexed by the MDA index 342(1) for instruction ID is no longer speculative according to the received commit indicator 328. The cache controller 300 can deallocate the SAR entry 338(1) in response to receiving the commit indicator 328 indicating instruction ID 1 was committed to make room for recording the delayed cache update status of future received data requests 118.

To illustrate an example of the use of the SAR circuit 336 and speculative buffer memory 318 in the non-speculative cache memory 114 to track recorded speculative data requests and to be able to defer updating a cache state in the non-speculative cache memory 114 until the data request becomes non-speculative, FIGS. 6A and 6B are provided. FIG. 6A illustrates the processor 102 in FIG. 1 issuing a data request 118 comprising an instruction ID and target address that is received by a non-speculative cache memory 114 resulting in a cache miss to the main data array 308 and the speculative buffer memory 318. In this example, the instruction ID in the data request 118 identifying the processing instruction that caused the data request 118 to be issued is instruction ID 7. The cache controller 300 in the non-speculative cache memory 114 is configured to search the main data array 308 and the speculative buffer memory 318 to search for the data corresponding to the target address of the data request 118. In this example, the data corresponding to the target address of the data request 118 is not contained in either the main data array 308 or the speculative buffer memory 318 of the non-speculative cache memory 114. The instruction identified by instruction ID 1 that caused the data request 118 to be issued is deemed speculative until the commit indicator 328 is received by the non-speculative cache memory 114 indicating otherwise as previously discussed.

The cache controller 300 in the non-speculative cache memory 114 is configured to allocate an available buffer entry 320(7) in the speculative buffer memory 318 as shown in FIG. 6A, which is index 7 in this example. This is so the data for the data request 118 associated with instruction ID 1 and stored in the speculative buffer memory 318 in a speculative state in response to a received fill response 306 from a higher level memory can be retrieved and installed by the cache controller 300 in the main data array 308 when the data request 118 becomes non-speculative. The in-cache indicator 332(7) in the buffer entry 320(7) is set to '0' in this example meaning the data associated with the received data request 118 is not contained in the main data array 308. The non-speculative indicator 330(7) for the buffer entry 320(7) is set to '0' to indicate a speculative state in this example. The valid indicator 334(7) is set to '1' to indicate the buffer entry 320(7) is valid in this example. If no buffer entry 320(0)-320(B) is available in the speculative buffer memory 318, the cache controller 300 can be configured to send a retry indicator to the requestor in the processor 102 as a data response 302 to indicate for the requestor to retry the data request 118 at a later time. This provides more time for data requests 118 with recorded deferred cache state updates stored in the speculative buffer memory 318 to become non-speculative, which will then cause their respective buffer entries 320(0)-320(B) to be able to be used and/or re-allocated as discussed in more detail below with regard to FIG. 6B.

With reference back to FIG. 6A, the cache controller 300 in the non-speculative cache memory 114 is also configured to allocate the SAR entry 338(0) in the SAR circuit 336 associated with an instruction ID 1 to record deferral of a cache state update in the main data array 308 for the data request 118. As shown in FIG. 6A, instruction ID 1 is stored in the instruction ID 340(0) of the SAR entry 338(0). Since the data request 118 resulted in a cache miss, a null is contained in MDA index 342(0) since the data for the data request 118 is not stored in the main data array 308. A SB index of '7' is stored in the SB index 344(0) in this example to point to buffer entry 320(7) allocated in the speculative buffer memory 318 that records the speculative state of the data request 118 associated with instruction ID 1. In this regard, the cache controller 300 can later search in the SAR circuit 336 for instruction ID 1 when its associated data request 118 becomes non-speculative to determine the buffer entry 320(0)-320(B) to update its respective speculative indicator 330(7) to a non-speculative state. Note that a null is stored in the MDA index 342(0) for the SAR entry 338(1), because the data for the data request 118 is not contained main data array 308. The cache controller 300 is configured to write the data for the data requests 118 associated with instruction IDs contained in a buffer entry 320(0)-320(B) in the speculative buffer memory 318 that have a speculative indicator 330(7) as a non-speculative state. FIG. 6B illustrates an example of the processor 102 in FIG. 6A receiving a commit indicator 328 identifying instruction ID 1 as being committed. In response, the cache controller 300 is configured to search the SAR circuit 336 to determine if a SAR entry 338 contains instruction ID 1 in an instruction ID 340(0)-340(S) to indicate that the updating of cache state of the data request 118 associated with instruction ID 1 was deferred. In this example, instruction ID 1 is contained in SAR entry 338(0) in response to the received data request 118 caused by the processing of instruction ID 1 as illustrated in FIG. 6A and previously described. The cache controller 300 is configured to, in response to determining instruction ID 1 is contained in SAR entry 338(0), consult the SB index 344(0) to determine the buffer entry 320(0)-320(B) associated with instruction ID 1. In this example, an index of '7' is stored in SB index 344(0) to point to buffer entry 320(7) in the speculative buffer memory 318. The non-speculative indicator 330(7) is set to a non-speculative state, which is a '1' in this example. In this manner, the cache controller 300 can write the data associated with the data request 118 for instruction ID 1 recorded in buffer entry 320(7) in the main data array 308. The cache controller 300 may wait to write the data associated with the data request 118 for instruction ID 1 recorded in buffer entry 320(7) in the main data array 308 until a new buffer entry 320(0)-320(B) needs to be allocated in speculative buffer memory 318 and there are no empty buffer entries 320(0)-320(B). The data associated with the data request 118 for instruction ID 1 can remain in buffer entry 320(7), because a subsequent data request 118 for the same data based on its target address can be fulfilled as a cache hit from the speculative buffer memory 318 as previously described. When the cache controller 300 writes the data associated with the data request 118 for instruction ID 1 recorded in buffer entry 320(7) in the main data array 308, the in-cache indicator 332(7) will be set to indicate the data is stored in the main data array 308 by a '1' indicator. Thus, when the cache controller 300 needs to allocate a new buffer entry 320(0)-320(B) in the speculative buffer memory 318 for a new data request 118, the cache controller 300 can search for a buffer entry 320(0)-320(B) that has its in-cache indicator set to '1' in this example. This means that the data for the buffer entry 320(0)-320(B) has been written to the main data array 308 as non-speculative data, and thus the associated buffer entry 320(0)-320(B) can be de-allocated and/or re-allocated.

With regard to the SAR circuit 336 and speculative buffer memory 318 in FIG. 3 and the updating of the speculative state of a tracked data request 118 to a non-speculative state in the example in FIG. 6B, an instruction ID becoming non-speculative will eventually trigger the cache controller 300 to write the data for the data request 118 associated with the instruction ID to the main data array 308. As discussed above, the buffer entry 320(0)-320(B) in the speculative buffer memory 318 for an instruction ID that has become non-speculative and its mapped SAR entry 338(0)-338(S) associated will be de-allocated in the speculative buffer memory 318 to make it available for another data request 118. However, other instructions IDs may be allocated in SAR entries 338(0)-338(S) in the SAR circuit 336 that are mapped to the same buffer entry 320(0)-320(M) in the speculative buffer memory 318. For example, multiple data requests 118 may have the same target address. If the buffer entry 320(0)-320(M) in the speculative buffer memory 318 mapped to multiple SAR entries 338(0)-338(S) is de-allocated, the remaining SAR entries 338(0)-338(S) mapped to the same buffer entry 320(0)-320(M) in the speculative buffer memory 318 will be unaware it is pointed to buffer entry 320(0)-320(M) has been de-allocated. Thus, an instruction ID associated with such SAR entries 338(0)-338(S) that later becomes non-speculative will lose its mapping to the speculative buffer memory 318 making it not possible to update is associated cache state. As discussed below, one way to address this issue is to provide another level of indirection of mapping between a SAR circuit 336 and the speculative buffer memory 318.

The SAR circuit 336 discussed above for tracking the speculative state of data requests 118 received by the non-speculative cache memory 114 can also be used in combination with a virtual fill buffer (VFB) circuit. As discussed in below, a virtual fill buffer (VFB) circuit can be used to map SAR entries 338(0)-338(S) to buffer entries 320(0)-320(B) in the speculative buffer memory 318. The VFB circuit can be used to track if data associated with a buffer entry 320(0)-320(B) in the speculative buffer memory 318 becomes non-speculative and is written to the main data array 308, such that other instruction IDs can remain mapped to the VFB circuit. The VFB circuit can track if the buffer entry 320(0)-320(B) in the speculative buffer memory 318 associated with an instruction ID remaining mapped from the SAR circuit 336 to the VFB circuit has been written to the main data array 308 so that the cache state update for such other mapped instruction IDs can be updated straight into the main data array 308 since its mapped associated buffer entry 320(0)-320(B) in the speculative buffer memory 318 will have been de-allocated.

Note with reference back to the non-speculative cache memory 114 in FIG. 3 and in regard to FIGS. 6A and 6B, that when a cache entry 310(0)-310(M) is evicted from the main data array 308 by the cache controller 300, the cache controller 300 may also update a buffer entry 320(0)-320(B) in the speculative buffer memory 318. For example, if a particular cache entry 310(0)-310(M) (e.g., by its set/way) in the main data array 308 is identified as a victim entry to be evicted by the cache controller 300, the cache controller 300 may be configured to search the buffer entries 320(0)-320(B) to determine if there are any buffer entries 320(0)-320(B) in the speculative buffer memory 318 that correspond to the evicted cache entry 310(0)-310(M). If so, such corresponding buffer entry(ies) 320(0)-320(B) can be invalidated by setting its respective valid indicator 334(0)-334(B) to an invalid state (e.g., to a '0' state). In this manner, if a new data request 118 is received in the non-speculative cache memory 114 having a target address corresponding to the evicted cache entry 310(0)-310(M), which will result in a cache miss to the main data array 308, a cache hit will not occur in the speculative buffer memory 318 falsely. In this regard, FIGS. 7A-7D illustrate an example of the processor 102 in FIG. 1 issuing data requests 118 received by a non-speculative cache memory 114 in cache memory system 106. In this example, the non-speculative cache memory includes an alternative SAR circuit 700 that can be mapped to entries in a virtual fill buffer (VFB) circuit 708 that is mapped to the speculative buffer memory 318 for tracking speculative data requests 118 and updating the cache state of such requests in the main data array 308 when they become non-speculative. In this example, as shown in FIG. 7A, three (3) data requests 118 are made to the non-speculative cache memory 114 identified by three (3) instruction IDs as instruction IDs 1, 4, and 8. The cache controller 300 in the non-speculative cache memory 114 is configured to search the main data array 308 and the speculative buffer memory 318 to search for the data corresponding to the target address of these three data requests 118. In this example, the data corresponding to the target address of the data request 118 for instruction ID 1 is not contained in either the main data array 308 or the speculative buffer memory 318 of the non-speculative cache memory 114 resulting in a cache miss. The cache controller 300 allocates an SAR entry 702(0) in the SAR circuit 700 in shown in FIG. 7A that is similar to the SAR circuit 336 in FIG. 3. The instruction ID 1 is stored in the instruction ID 704(0) in SAR entry 702(0). The cache controller 300 also allocates a VFB entry 710(7) in the VFB circuit 708 in shown in FIG. 7A. Index '7' corresponding to allocated VFB entry 710(7) is stored in a VFB index 706(0) in the SAR circuit 700 to map SAR entry 702(0) for instruction ID 1 to VFB entry 710(7) in VFB circuit 708. An in-cache indicator 714(7) in the SAR entry 702(7) is set to the data associated with the data request 118 initiated from instruction ID 1 as not being in the main data array 308 since the data request 118 relating to instruction ID 1 resulted in a cache miss. Thus, an MDA index 716(7) in the VFB entry 710(7) is set to '0' or null as not pointing to a location in the main data array 308. However, the speculative buffer (SB) index 718(7) in the VFB circuit 708 is set to index '4' to map VFB entry 710(7) to buffer entry 320(4) in the speculative buffer memory 318 that contains the data received from a fill response 306 to allocated buffer entry 320(4) in the speculative buffer memory 318.

The cache controller 300 in the non-speculative cache memory 114 is also configured to search the main data array 308 and the speculative buffer memory 318 to search for the data corresponding to the target address of data request 118 for instruction IDs 4 and 8. In this example, both these searches result in a cache hit to the speculative buffer memory 318 since these instructions are to the same target address as the target address for data request 118 for instruction ID 1, and the cache controller 300 has filled this data into buffer entry 320(4) in the speculative buffer memory 318 from the fill response 306. Thus, SAR entries 702(0) and 702(2) with instruction IDs 1 and 7 in instruction IDs 704(0) and 704(2) are also both mapped to VFB index '7' in their respective VFB indices 706(0), 706(2). Thus, providing the VFB circuit 708 allows multiple SAR entries, which in this example are SAR entries 702(1)-702(2), to be mapped to the same VFB index, which can be mapped to a buffer entry 320(0)-320(B) in the speculative buffer memory 318 to provide another level of mapping indirection.

Note also, that as an option, when a current SAR entry 702(0)-702(S) in the SAR circuit 700 is allocated in response to a new data request 118, if there is an older SAR entry 702(0)-702(S) pointing to the same VFB entry 710 in the VFB circuit 708, the current SAR entry 702(0)-702(S) can be collapsed into the older SAR entry 702(0)-702(S). The current SAR entry 702(0)-702(S) can replace the older SAR entry 702(0)-702(S) or be disregarded such that a new SAR entry 702(0)-702(S) is not allocated. For example, in the SAR circuit 700 in FIG. 7B, if SAR entries 702(0) and 702(1) were both related to instruction ID 1, both SAR entries 702(0), 702(1) could be provided as one SAR entry 702 since both point to the same VFB entry 710(7). As shown in FIG. 7B, the non-speculative cache memory 114 in this example receives a commit indicator 328 for instruction ID 1 to indicate that instruction ID 1 has been committed in the processor 102, and thus the data associated with the data request 118 for instruction ID 1 in buffer entry 320(4) in the speculative buffer memory 318 is now non-speculative. In this regard, the cache controller 300 changes the NS indicator 330(4) for buffer entry 320(4) to '1' to indicate that this entry is non-speculative. Also, as shown in FIG. 7C, the cache controller 300 also changes the in-cache indicator 332(4) in buffer entry 320(4) to '1' to indicate that the data associated with the data request 118 for instruction ID 1 is contained in the main data array 308 in response to the data being received from a higher level memory in a data response 302. The cache controller 300 can write the data associated with the data request 118 for instruction ID 1 recorded in buffer entry 320(4) in the main data array 308 based on its NS indicator 330(4) indicating a non-speculative state as shown in FIG. 7C when buffer entry 320(4) is reclaimed. As shown in FIG. 7D, instructions IDs 4 and 8 in SAR entries 702(0), 702(1) mapped to VFB entry 710(7) can use the in-cache indicator 714(7) and MDA index 716(7) to know the location of the cache entry 310(0)-310(M) to update when instructions ID 4 and 8 become non-speculative. Thus, if buffer entry 320(4) is de-allocated by the cache controller 300 before instruction IDs 4 and 8 become non-speculative, the VFB circuit 708 holds information necessary for the cache states for data of data requests 118 associated with instruction IDs 4 and 8 to be updated in the main data array 308 using the in-cache indicator 714(7) and the MDA index 716(7).

Note that for any of the described examples above, the NS indicators 330(0)-330(B) in the speculative buffer memory 318 in the non-speculative cache memory 114 can be further used by the cache controller 300 to affect the order in which buffer entries 320(0)-320(B) are evicted from the speculative buffer memory 318. Recall that upon evicting a buffer entry 320(0)-320(B), if the NS indicator 330(0)-330(B) is set to a non-speculative state for buffer entry 320(0)-320(B), the corresponding data for the buffer entry 320(0)-320(B) will get written to the main memory 108, otherwise, the buffer entry 320(0)-320(B), is dropped. Assuming a base fill buffer replacement policy (e.g., FIFO, LRU, PLRU, MRU, random, SRRIP, DRRIP, etc.), an optional enhanced replacement policy can be employed. If the NS indicators 330(0)-

330(B) for all the buffer entries 320(0)-320(B) are marked in a non-speculative state, a base replacement policy can be employed by the cache controller 300 to replace buffer entries 320(0)-320(B). If an NS indicator 330(0)-330(B) for one buffer entry 320(0)-320(B) is marked in a non-speculative state, such buffer entry 320(0)-320(B) can be replaced first. If the NS indicator 330(0)-330(B) for more than one buffer entry 320(0)-320(B) is marked in a non-speculative state, a base replacement policy can be applied to all buffer entries 320(0)-320(B) having an NS indicator 330(0)-330(B) marked in a non-speculative state. If all the buffer entries 320(0)-320(B) have an NS indicator 330(0)-330(B) marked in a speculative state, any of the following replacement policies can be employed as examples: a base replacement policy, choose the most recently used (MRU) buffer entry 320(0)-320(B), choose the least recently used (LRU) buffer entry 320(0)-320(B), choose the last inserted buffer entry 320(0)-320(B), choose the first inserted buffer entry 320(0)-320(B), and choose a random buffer entry 320(0)-320(B). A combination of the above replacement policies can be chosen on extra meta information about the cache line requestors (e.g., MRU if it is likely to be flushed, or LRU if it is a stream, etc.).

Further, in cases where a non-speculative cache memory 114 can receive data requests 118 from multiple CPU cores 110(1)-110(N), a SAR circuit 336, 700 can be implemented to maintain a record of all the data accesses for the data requests 118 as well as the identification of the CPU core 110(0)-110(N) as the requestor. The VFB circuit 708 could be shared among multiple CPU cores 110(1)-110(N). In response to data requests 118, the non-speculative cache memory 114 can be configured to send back a commit identification to allow targeted commit messages by CPU core 110(1)-110(N) to be sent to the non-speculative cache memories 114(1)-114(X). This can lower the traffic on the interconnect bus 117 in FIG. 1 between the CPU core 110(0)-110(N) and cache memories 114(1)-114(X). Also, instead of sending one commit message per non-speculative data request 118, the processor 102 could also send a bundle message of instruction commit information to lower the interconnect bus 117 traffic. The bundle of instruction commit information can be explicit where each instruction ID for a data request 118 is specified in a bundle message, or implicit where the instruction ID implies that all instruction IDs lower than the non-speculative instruction ID are also non-speculative.

FIG. 8 is a block diagram of an exemplary processor-based system 800 that includes a processor 802 (e.g., a microprocessor) that includes an instruction processing circuit 804. The processor-based system 800 can be the processor-based system 100 in FIG. 1 as an example. The instruction processing circuit 804 can be the instruction processing circuit 200 in FIG. 2 as an example. The processor-based system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 808 for temporary, fast access memory storage of instructions accessible by the instruction processing circuit 804. Fetched or prefetched instructions from a memory, such as from a main memory 810 over a system bus 812, are stored in the instruction cache 808. The instruction processing circuit 804 is configured to process instructions fetched into the instruction cache 808 and process the instructions for execution.

The processor 802 can include a local cache memory 814 to store cached data in the main memory 810. Cache memory 816 outside the processor 802 between the local cache memory 814 and the main memory 810 can also be provided to provide a cache memory system 818. The cache memories 814, 816 in the cache memory system 818 can include any of the cache memories 114(1)-114(X) in FIGS. 1, 3, 5A-5B, 6A-6B, and 7A-7D and be configured to defer updating a cache state in response to receiving a data request from the processor 802 until the data request becomes non-speculative.

The processor 802 and the main memory 810 are coupled to the system bus 812 and can intercouple peripheral devices included in the processor-based system 800. As is well known, the processor 800 communicates with these other devices by exchanging address, control, and data information over the system bus 812. For example, the processor 802 can communicate bus transaction requests to a memory controller 819 in the main memory 810 as an example of a slave device. Although not illustrated in FIG. 8, multiple system buses 812 could be provided, wherein each system bus constitutes a different fabric. In this example, the memory controller 819 is configured to provide memory access requests to a memory array 820 in the main memory 810. The memory array 820 is comprised of an array of storage bit cells for storing data. The main memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the main memory 810, one or more input device(s) 822, one or more output device(s) 824, a modem 826, and one or more display controllers 828, as examples. The input device(s) 822 can include any type of input device, including but not limited to input keys, switches, voice processors, etc. The output device(s) 824 can include any type of output device, including but not limited to audio, video, other visual indicators, etc. The modem 826 can be any device configured to allow exchange of data to and from a network 830. The network 830 can be any type of network, including but not limited to a wired or wireless network, a private or public network, a local area network (LAN), a wireless local area network (WLAN), a wide area network (WAN), a BLUETOOTH™ network, and the Internet. The modem 826 can be configured to support any type of communications protocol desired. The processor 802 may also be configured to access the display controller(s) 828 over the system bus 812 to control information sent to one or more displays 832. The display(s) 832 can include any type of display, including but not limited to a cathode ray tube (CRT), a liquid crystal display (LCD), a plasma display, etc.

The processor-based system 800 in FIG. 8 may include a set of instructions 834 to be executed by the processor 802 for any application desired according to the instructions. The instructions 834 may be stored in the main memory 810, processor 802, and/or instruction cache 808 as examples of a non-transitory computer-readable medium 836. The instructions 834 may also reside, completely or at least partially, within the main memory 810 and/or within the processor 802 during their execution. The instructions 834 may further be transmitted or received over the network 830 via the modem 826, such that the network 830 includes computer-readable medium 836.

While the computer-readable medium 836 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques.

For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A non-speculative cache memory in a processor-based system, comprising:
    a main data array comprising a plurality of cache entries each configured to store cache data associated with a memory address in a memory system of the processor-based system;
    a speculative buffer memory comprising a plurality of buffer entries each comprising a data entry configured to store cached data associated with a memory address in the memory system; and
    a cache controller configured to:
        receive a data request from a requestor comprising a target address and an instruction identification (ID) identifying a load instruction comprising the target address processed by a processor in the processor-based system;
        search for a cache entry in the main data array associated with the target address of the data request;
        search the speculative buffer memory for a buffer entry associated with the target address of the data request;
        send a data response to the data request to the requestor based on cache data in the main data array being associated with the target address and cache data in a buffer entry in the speculative buffer memory being associated with the target address;
        receive a commit indicator comprising an instruction ID of an instruction that is non-speculative; and
        in response to the received instruction ID in the commit indicator indicating the load instruction of the data request is non-speculative:
            update a cache state of a cache entry in the main data array associated with the target address of the data request.

2. The non-speculative cache memory of claim 1, wherein:
    the cache controller is further configured determine if a cache entry in the main data array is associated with the target address of the data request; and
    in response to a cache entry in the main data array associated with the target address of the data request, the cache controller is configured to send the data response to the data request to the requestor comprising cache data in the cache entry in the main data array having the target address associated with the target address of the data request.

3. The non-speculative cache memory of claim 2, wherein the cache controller is configured to, in response to the received instruction ID in the commit indicator indicating the load instruction of the data request is non-speculative, update the cache state comprising a cache replacement state of the cache entry in the main data array associated with the target address of the data request.

4. The non-speculative cache memory of claim 3, further comprising a speculative access record (SAR) circuit configured to store a SAR entry comprising an instruction ID entry and a main data array entry;
    wherein, the cache controller is further configured to:
        in response to a cache entry in the main data array associated with the target address of the data request, the cache controller is further configured to:
            allocate a SAR entry in the SAR circuit, the SAR entry comprising an instruction ID entry comprising the instruction ID of the load instruction of the data request, and a main data array entry comprising an index to a cache entry in the main data array associated with the target address of the data request; and
        in response to the received instruction ID in the commit indicator indicating the load instruction of the data request is non-speculative:
            determine if the received instruction ID is contained in an instruction ID entry in a SAR entry in the SAR circuit; and
            in response to determining the received instruction ID is contained in a SAR entry in the SAR circuit, update the cache replacement state of the cache entry in the main data array corresponding to the index in the main data array entry in the SAR entry containing the received instruction ID.

5. The non-speculative cache memory of claim 2, wherein the cache controller is further configured to, in response to a cache entry in the main data array not being associated with the target address of the data request:
    determine if a buffer entry in the speculative buffer memory is associated with the target address of the data request; and
    in response to a buffer entry in the speculative buffer memory being associated with the target address of the data request, the cache controller is configured to send the data response to the data request to the requestor comprising cache data in the buffer entry in the speculative buffer memory having the target address associated with the target address of the data request.

6. The non-speculative cache memory of claim 5, wherein the cache controller is further configured to, in response to the received instruction ID in the commit indicator indicating the load instruction of the data request is non-speculative:
    write the cache data in the buffer entry in the speculative buffer memory having the target address associated with the target address of the data request, to a cache entry in the main data array.

7. The non-speculative cache memory of claim 6, wherein the cache controller is configured to, in response to the received instruction ID in the commit indicator indicating the load instruction of the data request is non-speculative:
    update the cache state comprising a cache replacement state of the cache entry in the main data array associated with the target address of the data request.

8. The non-speculative cache memory of claim 6, further comprising a speculative access record (SAR) circuit configured to store a SAR entry comprising an instruction ID entry and a speculative buffer memory index entry;
the cache controller is further configured to:
in response to a buffer entry in the speculative buffer memory being associated with the target address of the data request:
allocate a SAR entry in the SAR circuit, the SAR entry comprising an instruction ID entry comprising the instruction ID of the load instruction of the data request, and a speculative buffer memory index entry comprising an index to a buffer entry in the speculative buffer memory associated with the target address of the data request; and
in response to the received instruction ID in the commit indicator indicating the load instruction of the data request is non-speculative:
determine if the received instruction ID is contained in an instruction ID entry in a SAR entry in the SAR circuit; and
in response to determining the received instruction ID is contained in a SAR entry in the SAR circuit, update a cache replacement state of the cache entry in the main data array associated with the target address of the data request.

9. The non-speculative cache memory of claim 6, wherein:
each buffer entry in the speculative buffer memory further comprises a non-speculation indicator indicating if the buffer entry is non-speculative; and
the cache controller is further configured to:
in response to a buffer entry in the speculative buffer memory associated with the target address of the data request:
set a non-speculative indicator in the buffer entry in the speculative buffer memory associated with the target address of the data request to a speculative state.

10. The non-speculative cache memory of claim 9, wherein the cache controller is further configured to, in response to the received instruction ID in the commit indicator indicating the load instruction of the data request is non-speculative:
set the non-speculative indicator in the buffer entry in the speculative buffer memory associated with the target address of the data request to a non-speculative state.

11. The non-speculative cache memory of claim 5, wherein the cache controller is further configured, in response to a buffer entry in the speculative buffer memory not being associated with the target address of the data request:
send the data request to a next higher level memory in the processor-based system;
receive data for the data request from the next higher level memory;
determine if a buffer entry in the speculative buffer memory is available to store cache data; and
in response to determining a buffer entry in the speculative buffer memory is available to store cache data, write the data for the data request received from the next higher level memory in an available buffer entry in the speculative buffer memory and an available buffer entry associated with the target address of the data request.

12. The non-speculative cache memory of claim 11, wherein the cache controller is further configured to, in response to determining a buffer entry in the speculative buffer memory is not available to store cache data, send a retry indicator to the requestor to retry the data request.

13. The non-speculative cache memory of claim 11, wherein the cache controller is configured to, in response to the received instruction ID in the commit indicator indicating the load instruction of the data request is non-speculative:
update the cache state of the cache entry in the main data array associated with the target address of the data request, by being configured to write data for the data request in the buffer entry in the speculative buffer memory associated with the target address of the data request, to a cache entry in the main data array associated with the target address of the data request.

14. The non-speculative cache memory of claim 13, wherein the cache controller is further configured to select a buffer entry among the plurality of buffer entries in the speculative buffer memory to evict from the speculative buffer memory based on the speculative state in non-speculative indicators of the respective buffer entries.

15. The non-speculative cache memory of claim 14, wherein the cache controller is configured to select the buffer entry to evict from the speculative buffer memory according to a first replacement policy if all the non-speculative indicators of the respective buffer entries indicate a non-speculative state.

16. The non-speculative cache memory of claim 15, wherein the cache controller is configured to select the buffer entry to evict from the speculative buffer memory according to a second replacement policy different from the first replacement policy if all the non-speculative indicators of the respective buffer entries indicate a speculative state.

17. The non-speculative cache memory of claim 11, wherein:
each buffer entry in the speculative buffer memory further comprises a non-speculation indicator indicating if the buffer entry is non-speculative; and
the cache controller is further configured to:
in response to a buffer entry in the speculative buffer memory associated with the target address of the data request:
set a non-speculative indicator in the buffer entry in the speculative buffer memory being associated with the target address of the data request to a speculative state;
in response to the received instruction ID in the commit indicator indicating the load instruction of the data request is non-speculative:
set the non-speculative indicator in the buffer entry in the speculative buffer memory associated with the target address of the data request to a non-speculative state; and
in response to the non-speculative indicator in the buffer entry in the speculative buffer memory associated with the target address of the data request being set to a non-speculative state:
update the cache state of the cache entry in the main data array associated with the target address of the data request, by being configured to write data for the data request in the buffer entry in the speculative buffer memory associated with the target address of the data request, to a cache entry in the main data array associated with the target address of the data request.

18. The non-speculative cache memory of claim 17, further comprising a speculative access record (SAR) circuit configured to store a SAR entry comprising an instruction ID entry and a speculative buffer memory index entry;
the cache controller is further configured to:
in response to a buffer entry in the speculative buffer memory not being associated with the target address of the data request:
allocate a SAR entry in the SAR circuit, the SAR entry comprising an instruction ID entry storing the instruction ID of the load instruction of the data request, and the speculative buffer memory index entry storing an index to a buffer entry in the speculative buffer memory associated with the target address of the data request; and
in response to the received instruction ID in the commit indicator indicating the load instruction of the data request is non-speculative:
determine the buffer entry in the speculative buffer memory associated with the target address of the data request set to a non-speculative state based on an index in the speculative buffer memory index entry in a SAR entry in the SAR circuit having an instruction ID entry containing the received instruction ID;
the cache controller configured to:
set the non-speculative indicator in the buffer entry in the determined buffer entry in the speculative buffer memory associated with the target address of the data request to a non-speculative state.

19. The non-speculative cache memory of claim 18, wherein each SAR entry in the SAR circuit further comprises a central processing unit (CPU) core ID entry configured to store CPU core ID identifying the requestor of the received data request further comprising the CPU ID as the requestor;
the cache controller is further configured to, in response to the buffer entry in the speculative buffer memory not being associated with the target address of the data request, store the CPU ID in the received data request in the CPU entry of the allocated SAR entry in the SAR circuit.

20. The non-speculative cache memory of claim 19, wherein the cache controller is further configured to, in response to the buffer entry in the speculative buffer memory not being associated with the target address of the data request, send a cache ID identifying the non-speculative cache memory to the requestor CPU.

21. The non-speculative cache memory of claim 19, wherein the cache controller is further configured:
receive a commit indicator from the requestor CPU comprising a plurality of instruction IDs each identifying load instruction for data requests that are non-speculative; and
for each of the plurality of received instruction IDs in the commit indicator indicating the load instructions of the data requests are non-speculative, determine the buffer entry in the speculative buffer memory associated with the target address of each data request set to a non-speculative state based on an index in the speculative buffer memory index entry in the SAR entry in the SAR circuit having an instruction ID entry containing the received instruction ID.

22. The non-speculative cache memory of claim 21, wherein in response to the received instruction ID in the commit indicator indicating the load instruction of the data request is non-speculative, the cache controller is further configured to:

determine any instruction IDs stored in any instruction ID entry in SAR entries in the SAR circuit younger than the received instruction ID; and
set the non-speculative indicator in the SAR entry having an instruction ID in its instruction ID entry younger than the received instruction ID to a non-speculative state.

23. The non-speculative cache memory of claim 22, wherein the cache controller is further configured to, in response to determining any instruction IDs stored in any instruction ID entry in SAR entries in the SAR circuit younger than the received instruction ID, de-allocate the SAR entries in the SAR circuit having an instruction ID in its instruction ID entry younger than the received instruction ID.

24. The non-speculative cache memory of claim 17, further comprising:
a speculative access record (SAR) circuit configured to store a SAR entry comprising an instruction ID entry and a virtual fill buffer (VFB) index entry; and
a VFB circuit configured to store a VFB entry comprising an instruction ID entry and a VFB index entry;
the cache controller is further configured to:
in response to a buffer entry in the speculative buffer memory not being associated with the target address of the data request:
allocate a VFB entry in the VFB circuit, the VFB entry comprising an instruction ID entry comprising the instruction ID of the load instruction of the data request, and a VFB index entry comprising an index to a buffer entry in the speculative buffer memory associated with the target address of the data request; and
allocate a SAR entry in the SAR circuit, the SAR entry comprising the instruction ID entry storing the instruction ID of the load instruction of the data request, and the VFB index entry storing an index to a VFB entry in the VFB circuit having an instruction ID entry containing the instruction ID; and
in response to the received instruction ID in the commit indicator indicating the load instruction of the data request is non-speculative:
determine a VFB entry in the VFB circuit associated having an instruction ID entry containing an instruction ID indexed, based on an index in the VFB index in a SAR entry in the SAR circuit having an instruction ID entry containing the received instruction ID; and
determine the buffer entry in the speculative buffer memory associated with the target address of the data request set to a non-speculative state, based on an index in the VFB index entry in the determined VFB entry in the VFB circuit;
the cache controller configured to:
set the non-speculative indicator in the buffer entry in the determined buffer entry in the speculative buffer memory associated with the target address of the data request to a non-speculative state.

25. The non-speculative cache memory of claim 19, wherein the cache controller is further configured to, in response to allocating the SAR entry in the SAR circuit:
determine if another SAR entry contained in the SAR circuit comprises the instruction ID it its instruction ID entry and the VFB index entry in its VFB entry; and in response to determining the other SAR entry is contained in the SAR circuit, deallocate the SAR entry in the SAR circuit.

26. The non-speculative cache memory of claim 1, wherein the cache controller is further configured to evict a buffer entry in the speculative buffer memory in response to a cache entry in the main data array being evicted corresponding a memory address corresponding to the buffer entry.

27. A method of updating a cache state in a non-speculative cache memory in a processor-based system, comprising:
receiving a data request from a requestor comprising a target address and an instruction identification (ID) identifying a load instruction comprising the target address processed by a processor in the processor-based system;
searching a main data array for a cache entry associated with the target address of the data request among a plurality of cache entries each configured to store cache data associated with a memory address in a memory system of the processor-based system;
searching a speculative buffer memory for a buffer entry associated with the target address of the data request among a plurality of buffer entries each configured to store cache data associated with a memory address in the memory system;
sending a data response to the data request to the requestor based on a cache entry in the main data array being associated with the target address and a cache data in a buffer entry in the speculative buffer memory being associated with the target address;
receiving a commit indicator comprising an instruction ID of an instruction that is non-speculative; and
updating a cache state of a cache entry in the main data array associated with the target address of the data request, in response to the received instruction ID in the commit indicator indicating the load instruction of the data request is non-speculative.

28. The method of claim 27:
further comprising determining if a cache entry in the main data array is associated with the target address of the data request; and
comprising sending the data response to the data request to the requestor comprising cache data in the cache entry in the main data array having the target address associated with the target address of the data request, in response to a cache entry in the main data array associated with the target address of the data request.

29. The method of claim 28, comprising updating the cache state comprising a cache replacement state of the cache entry in the main data array associated with the target address of the data request, in response to the received instruction ID in the commit indicator indicating the load instruction of the data request is non-speculative.

30. The method of claim 28, further comprising, in response to a cache entry in the main data array not associated with the target address of the data request:
determining if a buffer entry in the speculative buffer memory is associated with the target address of the data request; and
sending the data response to the data request to the requestor comprising cache data in the buffer entry in the speculative buffer memory having the target address associated with the target address of the data request.

31. The method of claim 30, further comprising writing the cache data in the buffer entry in the speculative buffer memory having the target address associated with the target address of the data request, to a cache entry in the main data array, in response to the received instruction ID in the commit indicator indicating the load instruction of the data request is non-speculative.

32. The method of claim 31, comprising updating the cache state comprising a cache replacement state of the cache entry in the main data array associated with the target address of the data request, in response to the received instruction ID in the commit indicator indicating the load instruction of the data request is non-speculative.

33. The method of claim 30, further comprising, in response a buffer entry in the main buffer memory not associated with the target address of the data request:
sending the data request to a next higher level memory in the processor-based system;
receiving data for the data request from the next higher level memory;
determining if a buffer entry in the speculative buffer memory is available to store cache data; and
writing the data for the data request received from the next higher level memory in an available buffer entry in the speculative buffer memory associated with the target address of the data request, in response to determining a buffer entry in the speculative buffer memory is available to store cache data.

34. The method of claim 33, further comprising sending a retry indicator to the requestor to retry the data request, in response to determining a buffer entry in the speculative buffer memory is not available to store cache data.

35. The method of claim 33, comprising, in response to the received instruction ID in the commit indicator indicating the load instruction of the data request is non-speculative, updating the cache state of the cache entry in the main data array associated with the target address of the data request comprising:
writing data for the data request in the buffer entry in the speculative buffer memory associated with the target address of the data request, to a cache entry in the main data array associated with the target address of the data request.

* * * * *